(12) United States Patent
Lee et al.

(10) Patent No.: US 10,978,979 B2
(45) Date of Patent: Apr. 13, 2021

(54) POWER FACTOR ADJUSTMENT METHOD AND APPARATUS THROUGH THE PHASE CONTROL IN A TRANSFORMER CIRCUIT

(71) Applicant: PHASETOWN, LLC, Daejeon (KR)

(72) Inventors: Won Don Lee, Seoul (KR); Hijung Chai, Daejeon (KR); Aquila Hwan Lee, Downey, CA (US)

(73) Assignee: PHASETOWN, LLC, Daejeon (KR)

( * ) Notice: Subject to any disclaimer, the term of this patent is extended or adjusted under 35 U.S.C. 154(b) by 0 days.

(21) Appl. No.: 15/733,230

(22) PCT Filed: Dec. 12, 2017

(86) PCT No.: PCT/KR2017/014540
§ 371 (c)(1),
(2) Date: Jun. 12, 2020

(87) PCT Pub. No.: WO2019/117329
PCT Pub. Date: Jun. 20, 2019

(65) Prior Publication Data
US 2020/0336094 A1 Oct. 22, 2020

(51) Int. Cl.
*H02P 23/26* (2016.01)
*H01F 27/24* (2006.01)
(Continued)

(52) U.S. Cl.
CPC ............. *H02P 23/26* (2016.02); *H01F 27/24* (2013.01); *H01F 27/28* (2013.01); *H02M 1/4266* (2013.01)

(58) Field of Classification Search
CPC . B60L 15/00; H02J 3/00; H02M 1/00; H02M 7/00; H01F 27/42; H01F 30/16;
(Continued)

(56) References Cited

U.S. PATENT DOCUMENTS

| 5,754,420 A | 5/1998 | Luce |
| 10,673,327 B2 * | 6/2020 | Mondal ................. H02M 7/527 |

(Continued)

FOREIGN PATENT DOCUMENTS

| JP | 2002354670 A | 12/2002 |
| JP | 2012249454 A | 12/2012 |

(Continued)

OTHER PUBLICATIONS

International Search Report (PCT/ISA/210) dated Aug. 28, 2018, by the Korean Patent Office as the International Searching Authority for International Application No. PCT/KR2017/014540.
(Continued)

*Primary Examiner* — Said Bouziane
(74) *Attorney, Agent, or Firm* — Buchanan Ingersoll & Rooney PC

(57) ABSTRACT

In this work, it is shown for the first time that the power and the impedance in a transformer circuit depend on the phase of the flux, hence the phase of the current. There is a phase change when the flux travels the magnetic core, and formulas for the effect of the phase change in the power and the impedance are derived. Therefore, the power factor can be adjusted so that the power is delivered more at the load than that, at the primary supplied by the source.

7 Claims, 7 Drawing Sheets

(51) Int. Cl.
  *H01F 27/28* (2006.01)
  *H02M 1/42* (2007.01)
(58) Field of Classification Search
  CPC .......... H01F 36/00; H01F 21/00; H02P 23/26; H02P 13/00
  See application file for complete search history.

(56) References Cited

U.S. PATENT DOCUMENTS

| | | | |
|---|---|---|---|
| 2008/0025052 A1 | 1/2008 | Yasumura | |
| 2012/0257429 A1 | 10/2012 | Dong et al. | |
| 2015/0078053 A1 | 3/2015 | Harrison et al. | |

FOREIGN PATENT DOCUMENTS

| | | | |
|---|---|---|---|
| KR | 10-2007-0093349 A | 9/2007 | |
| KR | 20150110491 A | 10/2015 | |
| WO | 2014081155 A1 | 5/2014 | |

OTHER PUBLICATIONS

Written Opinion (PCT/ISA/237) dated Aug. 28, 2018, by the Korean Patent Office as the International Searching Authority for International Application No. PCT/KR2017/014540.
Betty I. Bleaney and B. Bleaney, Electricity and Magnetism, 3rd ed. (Oxford University Press, 1976), 212-213.
Bleaney and Bleaney, Electricity and Magnetism, 251.
Charles Porteus Steinmetz and Ernst J. Berg, Theory and Calculation of Alternating Current Phenomena, 3rd edition (New York Electrical World and Engineer Incorporated, 1900), 220.
Dean Banerjee, PLL Performance, Simulation and Design, 4th ed. (Dog Ear Publishing, LLC., Aug. 2006).
H. Wayne Beaty, ed., "Section 5—Three-Phase Induction Motors by Hashem Oraee" (PDF) Handbook of Electric Power Calculations (3rd ed.) (New York: McGraw-Hill, 2006), ISBN 0-07-136298-3.
H. Wayne Beaty, Standard Handbook for Electrical Engineers, Edition 16th ed. (New York: McGraw-Hill Professional Publishing, Aug. 2012), Chapter 20.
I. Boldea, The induction machines design handbook, 2nd ed. (Boca Raton, FL: CRC Press/Taylor & Francis, c2010).
J.B. Pendry, "Negative refraction makes a perfect lens," Phys. Rev. Lett. 85 (2001): 3966-3969.
Kaschke UI-1F4, 3C85 grade.
Kihun Chang, Tao Jiang, Lixin Ran, and Hao Xin, "Investigation of Microwave Negative Refractive Index (NRI) Transmission Lines Incorporating Tunnel Diodes," IEEE Antennas and Wireless Propagation Letters, vol. 11 (2012): 671-674.
Michael Tse, Lecture Note on EIE403: High Frequency Circuit Design, Hong Kong Polytechnic University, accessed Sep. 4, 2017, http://cktse.eie.polyu.edu.hk/eie403/impedancematching.pdf.
Samwha Electronics SD 105X15-5T.
Steinmetz and Berg, Theory and Calculation of Alternating Current Phenomena, 250.
Thomas Wu, Lecture Notes on EEL 4205 Electric Machinery, Chapter 7 Non-ideal Transformer, The University of Central Florida, accessed Sep. 15, 2017, http://www.eecs.ucf.edu/~tomwu/course/eel4205/notes/07%20Nonideal%20Transformer.pdf.
Office Action (First Examination Report) dated Nov. 25, 2020, by the Intellectual Property India in corresponding India Patent Application No. 202017025833 with an English Translation of the Office Action. (6 pages).

* cited by examiner

【Figure 1】
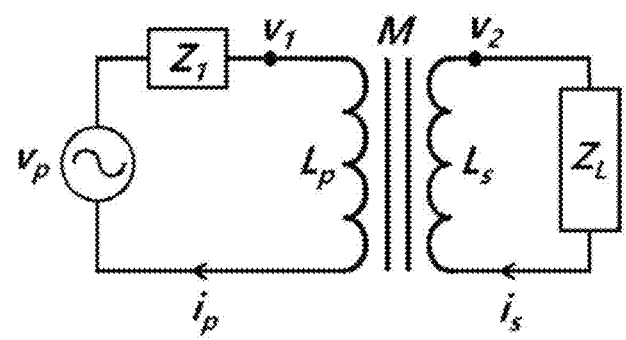
【Figure 2】
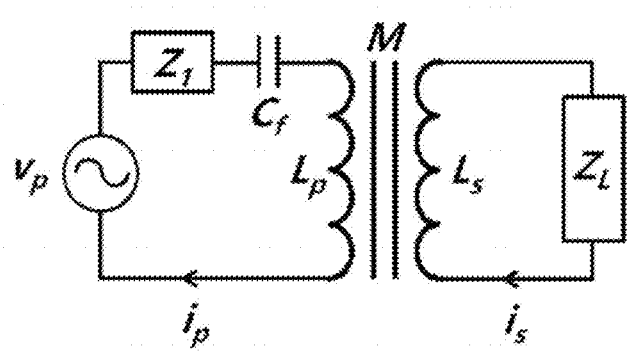

【Figure 3】
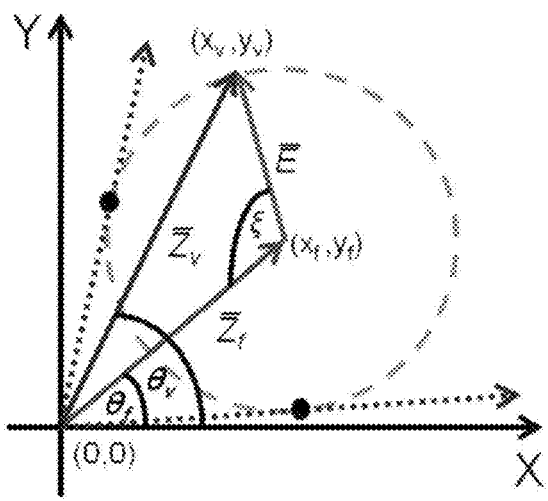
【Figure 4】
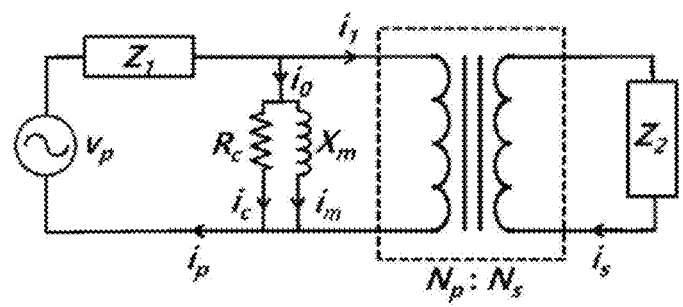
【Figure 5】
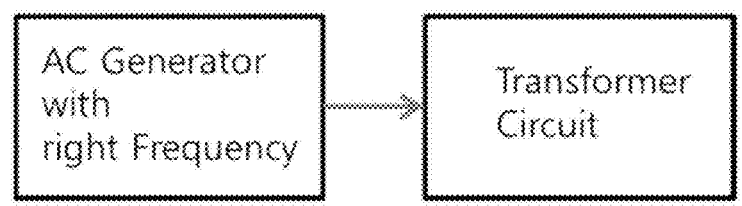

【Figure 6】
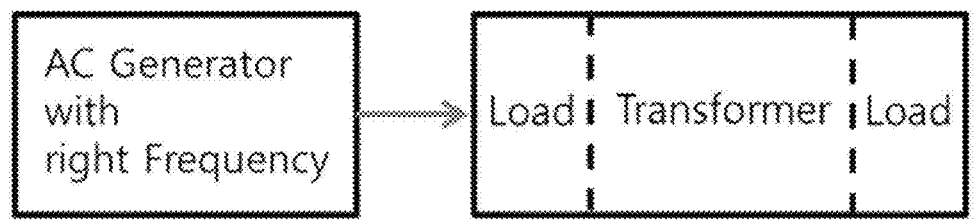
【Figure 7】
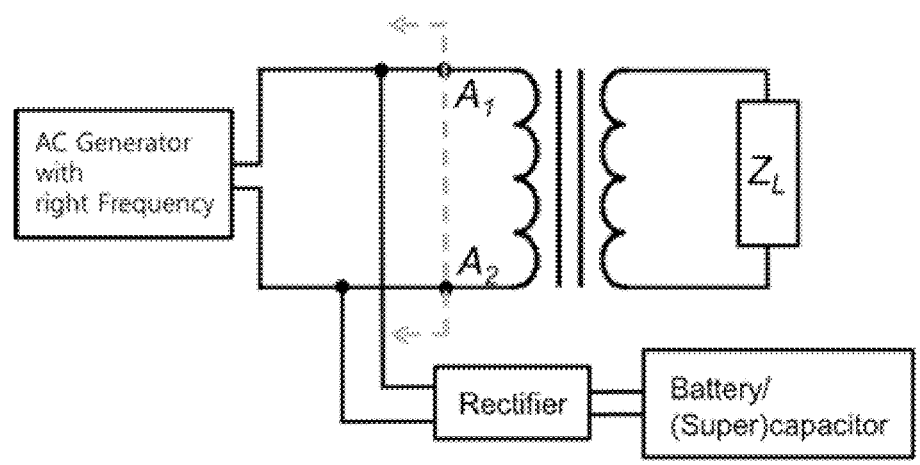
【Figure 8】
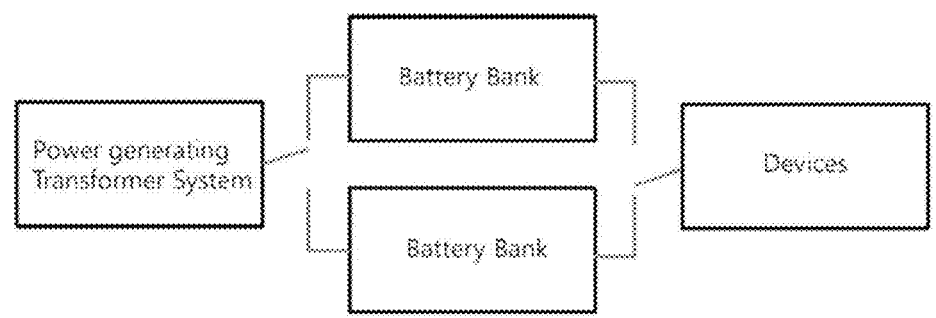

【Figure 9】
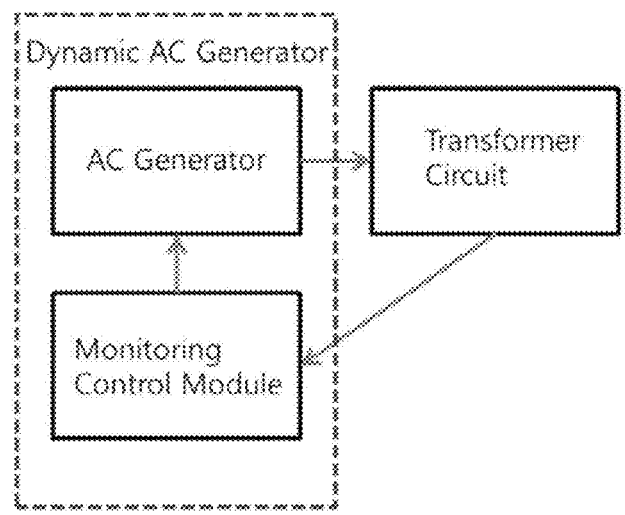
【Figure 10】
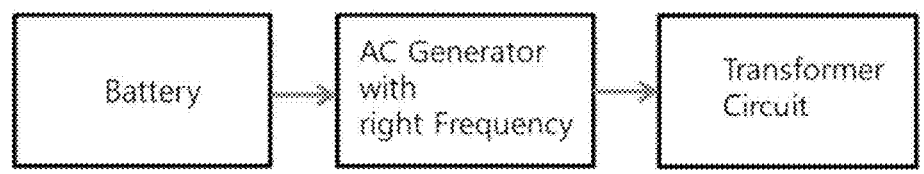
【Figure 11】
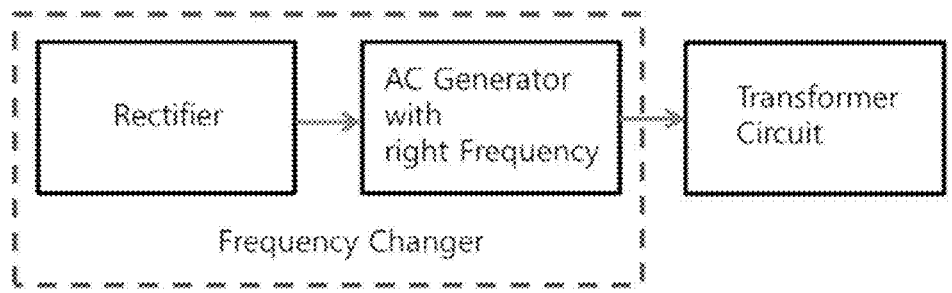

【Figure 12】
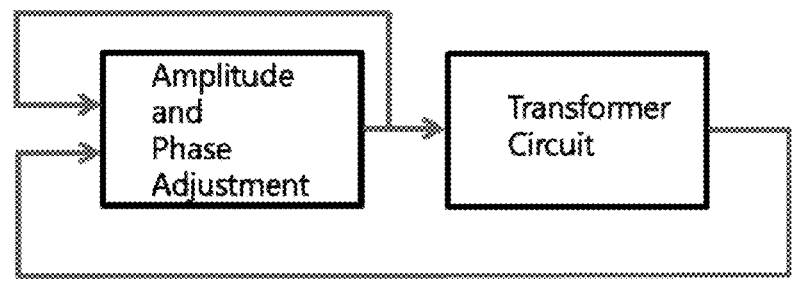
【Figure 13】
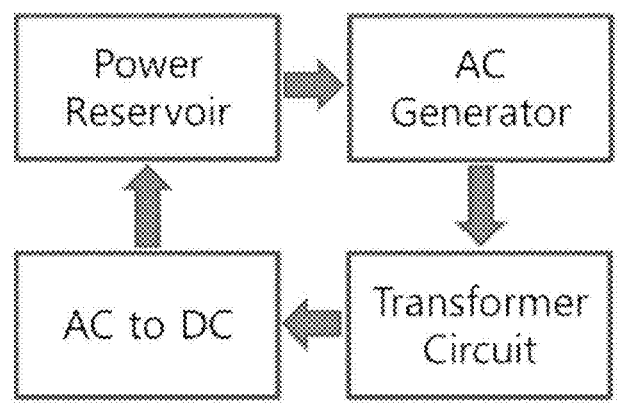
【Figure 14】
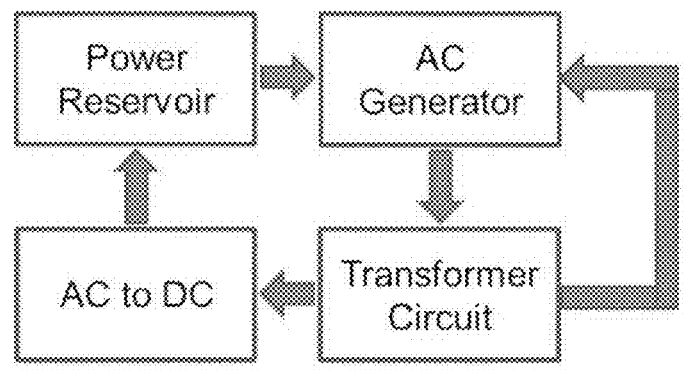

【Figure 15】
【Figure 16】
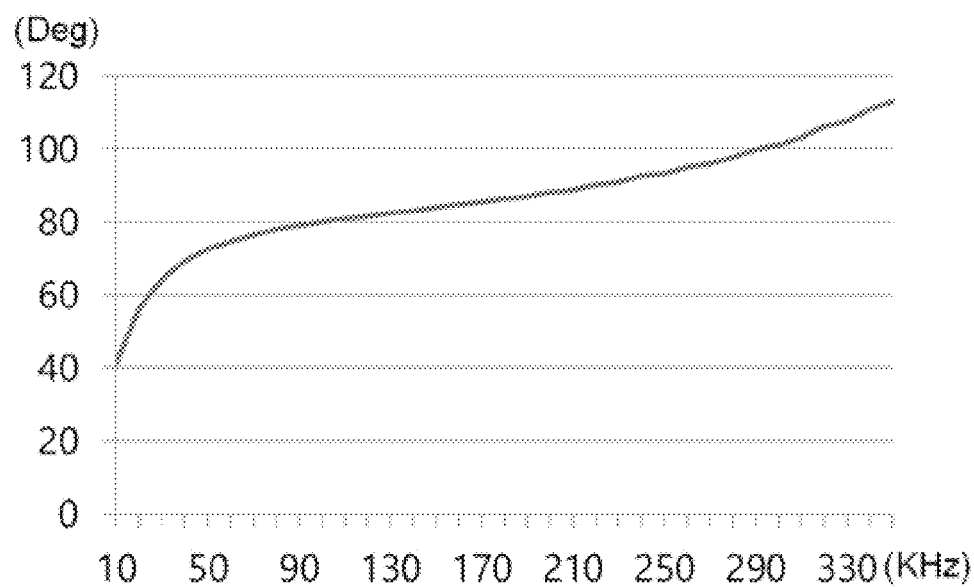

【Figure 17】
【Figure 18】
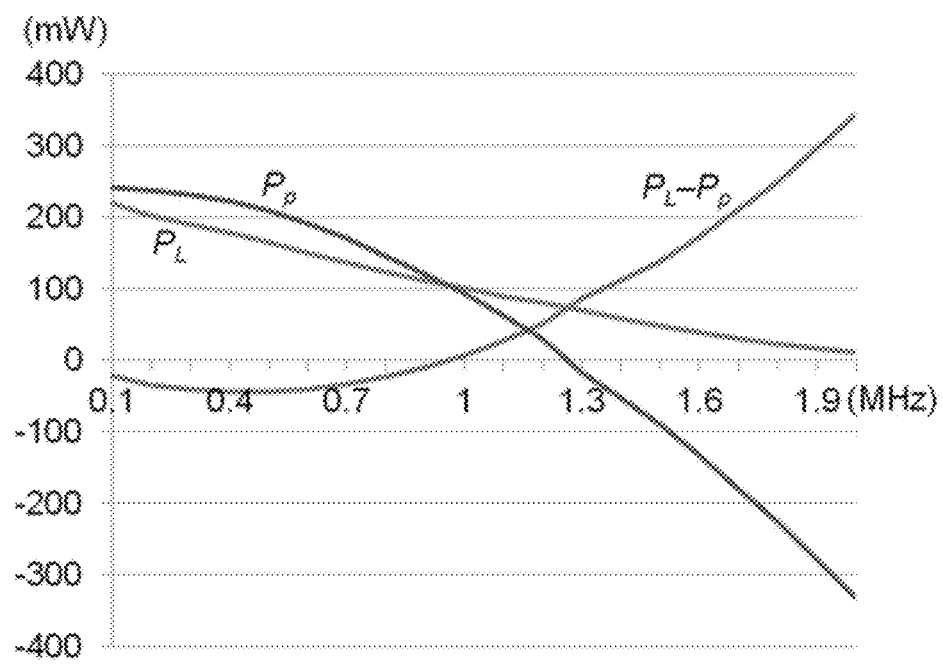

POWER FACTOR ADJUSTMENT METHOD AND APPARATUS THROUGH THE PHASE CONTROL IN A TRANSFORMER CIRCUIT

TECHNICAL FIELD

One or more embodiments relate to a method and apparatus for power factor adjustment through the phase control in a transformer circuit.

BACKGROUND ART

Transformers are devices that use electromagnetic induction to increase or decrease the AC voltage. The voltage and current transferred from the power source to the load vary according to the number of turns of the primary coil and the number of turns of the secondary coil.

DISCLOSURE

Technical Problem

One or more embodiments include a method and apparatus for increasing the power difference between the power dissipated at the load and the power at the primary that the source provides using power factor adjustment through the phase control in transformer circuit.

Technical Solution

According to one or more embodiments, a power factor adjustment apparatus, comprising: a magnetic core; a primary coil wound on the magnetic core configured to receive an alternating voltage from a source; wherein, a current is generated in a secondary coil of a transformer circuit or in a rotor of an induction machine by a magnetic flux propagated through the magnetic core, wherein, a phase change of the magnetic flux between the primary coil and the secondary coil is controlled so that a power factor of the transformer circuit or the induction machine is adjusted to a desired one among values that make a power difference function, representing difference between a power dissipated at a load at a secondary side and a power at the primary coil that the source provides, positive.

Wherein an absolute value of the phase change of the magnetic flux is proportional to a distance that the magnetic flux propagates through the magnetic core.

Wherein the absolute value of the phase change of the magnetic flux increases as a frequency of the current wave increases.

Wherein the phase change of the magnetic flux is controlled by altering a path length of the magnetic core, and/or by altering frequency of the alternating voltage, and/or by adding reactive components.

Wherein the magnetic core is made of laminated steel, ferrite, or any other material suited for high frequency range for a necessary phase change of the magnetic flux.

Wherein the power factor adjustment apparatus is configured as a part of the transformer circuit or the induction machine.

Wherein an AC generator configured to generate the alternating voltage of frequency and amplitude that make a phase of an impedance or the power difference function of the transformer circuit or the induction machine be within a specified range.

Wherein the load is connected to a primary side or the secondary side of the transformer circuit or the induction machine.

Advantageous Effects

According to the present disclosure, the power difference between the power dissipated at the load and the power at the primary that the source provides can be increased by controlling the power factor through the phase control in a transformer circuit.

DESCRIPTION OF DRAWINGS

FIG. 1 shows a circuit with a single phase lossless transformer.

FIG. 2 shows an LC resonant circuit at the primary in a transformer circuit.

FIG. 3 shows the impedance representation in the Cartesian coordinate.

FIG. 4 shows a circuit of a single phase imperfect transformer.

FIG. 5 shows a power generating transformer system.

FIG. 6 shows the power generating transformer system with the load at the primary side as well as at the secondary side.

FIG. 7 shows an example of the transformer circuit with the loads at the primary as well as at the secondary, connected to the AC generator with right frequency.

FIG. 8 shows an automatic switching system to charge a battery bank. The devices are powered by the battery bank not being charged by the transformer system.

FIG. 9 shows the power generating transformer system with the dynamic AC generator.

FIG. 10 shows a long-life battery system.

FIG. 11 shows a system that consumes low power. The example uses a rectifier as a part of the circuit to change the frequency. In general, the frequency changer is necessary.

FIG. 12 shows a self-sustaining system without a power reservoir.

FIG. 13 shows a self-sustaining system with a power reservoir.

FIG. 14 shows a self-sustaining system with a power reservoir with the monitoring control module.

FIG. 15 shows screenshot of N4L PPA5530 at 220 KHz of the experiment.

FIG. 16 shows phase of the impedance, $\theta_v$, vs. frequency.

FIG. 17 shows screenshot of N4L PPA5530 at 2 MHz of experiment 2.

FIG. 18 shows powers and the power difference vs. frequency. $P_L$ is the power at the load at the secondary, $P_p$ the power at the primary, $(P_L-P_p)$ the power difference.

MODE FOR INVENTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

1. A Modeling of the Process in a Transformer Circuit

FIG. 1 shows a circuit with a single phase lossless transformer.

Consider a model of a circuit including a lossless transformer, (reference: Betty I. Bleaney and B. Bleaney, *Electricity and Magnetism*, 3rd ed. (Oxford University Press, 1976), 212-213.)
where
- $v_p$ is the alternating sinusoidal input voltage with the angular frequency $\omega$,
- $v_1$ and $v_2$ are the voltages at the primary and the secondary coils, respectively,
- $Z_1$ is the impedance in series with the voltage source at the primary side or it can be or include the internal resistance of the voltage source,
- $Z_L$ is the load impedance at the secondary,
- $i_p$ and $i_s$ are the sinusoidal currents of the primary and the secondary, respectively, with the angular frequency of $\omega$,
- $L_p$, $L_s$ are the self-inductances of the primary and the secondary windings, respectively,
- $N_p$ and $N_s$ are the number of turns of the primary and the secondary coils, respectively,
- $n=N_s/N_p$ is the turns ratio,
- and M is the mutual inductance.

Then, $$v_1 = L_p(di_p/dt) - M(di_s/dt) = j\omega L_p i_p - j\omega M i_s \quad \text{(Eq. 1)}$$

$$0 = (Z_L + j\omega L_s)i_s - j\omega M i_p. \quad \text{(Eq. 2)}$$

The impedance of the circuit, $Z_p$, excluding the impedance of the voltage source, becomes:

$$Z_p = v_1/i_p = j\omega L_p + \omega^2 M^2/(Z_L + j\omega L_s). \quad \text{(Eq. 3)}$$

The above equations are derived by assuming that there is no phase change from the primary to the secondary as the magnetic flux propagates. A phase change, however, would occur during the propagation of the flux noticeably when relatively high frequencies are used. Here, high frequency means that it is higher than the utility frequency of 60 Hz, not HF (High Frequency) in the range of 3 MHz to 30 MHz. Then it is necessary to figure out the effect of the phase change, and the formulas of the transformer circuits should be modified to encompass the phase change accordingly.

Let us assume a lossless transformer with a complete coupling with $N_p$, $N_s$ turns at the primary and the secondary coils, respectively. Let the voltage $v_1$ be the sum of the two waves going to and from the secondary, $v_t(p)$ and $v_r(p)$, respectively:

$$v_1 = v_t(p) + v_r(p). \quad \text{(Eq. 4)}$$

Here, the subscripts t and r mean the "transmitted" and the "reflected", respectively, and p means it is at the "primary" side. Likewise, there are current waves at the primary side, $i_t(p)$ and $i_r(p)$, transmitted to and reflected from the secondary, respectively.

Similarly, at the secondary side, $v_2$ is the sum of the two waves, $v_t(s)$ and $v_r(s)$, where s means the "secondary":

$$v_2 = v_t(s) + v_r(s). \quad \text{(Eq. 5)}$$

Let the flux be likewise defined. So there are four kinds of fluxes: $\Phi_t(p)$, $\Phi_r(p)$, $\Phi_t(s)$, and $\Phi_r(s)$.

Because this is a circuit with a transformer, and because only the flux is going from the primary to the secondary and vice versa, there is no direct current flow between the primary and the secondary. But, because the flux is related to the current expressed in the equation below, the current can be regarded as if it flows forward and backward through the "mediation" of the flux:

$$Ni = \Phi \mathfrak{R}, \quad \text{(Eq. 6)}$$

where N, i, $\Phi$ and $\mathfrak{R}$ are the number of turns of the coil, the current, the magnetic flux, and the reluctance, respectively. In other words, the flux can be converted to the current, and is always in phase with the current. Therefore, the current is "virtually" travelling between the primary and the secondary. And it is assumed that the flux acts like a wave having the same phase with that of the current.

The voltage source provides the voltage $v_p$, and the current $i_t(p)$ generates the flux, and the change of the current induces an emf, hence the voltage, $v_t(p)$:

$$\Phi_t(p) = N_p i_t(p)/\mathfrak{R}, \quad \text{(Eq. 7)}$$

$$v_t(p) = L_p d\{i_t(p)/dt\} = j\omega L_p i_t(p). \quad \text{(Eq. 8)}$$

There are, in general, some losses occurring when the flux is propagating through the core. Instead of representing the loss by a resistance value in the transformer model, the attenuation constant, $\alpha$, is introduced in addition to the phase constant, $\beta$. The propagation constant, $\gamma$, is defined as:

$$\gamma = \alpha + j\beta. \quad \text{(Eq. 9)}$$

It is a simple modeling to describe the attenuation and the phase change during the flux propagation by one factor, $\exp(-\gamma \ell)$, yet it is effective and useful.

The flux, $\Phi_t(p)$, propagates through the magnetic core and experiences a phase change. Let the phase change of the magnetic flux of this forward direction be $(-\phi)$ for a distance of $\ell$ which is the length of the magnetic core from the primary coil to the secondary coil. Throughout this article, $\phi$ is termed as the "relative phase," and is related to $\beta$ as follows:

$$\phi = \beta \ell \quad \text{(Eq. 10)}$$

Then as $\Phi_t(p)$ arrives at the secondary side, the flux, $\Phi_t(s)$ becomes:

$$\Phi_t(s) = \exp(-\gamma \ell)\Phi_t(p) = \exp(-\alpha \ell)\exp(-j\phi)\Phi_t(p). \quad \text{(Eq. 11)}$$

Note that the current does not propagate to the secondary from the primary, but the flux does. However, because the flux $\Phi_t(s)$ has the phase change with some attenuation, the current $i_t(s)$ is also regarded to change by the same amount in the phase and the attenuation. To make the factor noted explicitly, $i_t(s)$ is written as:

$$i_t(s) = \exp(-\gamma \ell) i_t(p). \quad \text{(Eq. 12)}$$

At the secondary, an emf, e(s), is induced by the mutual induction:

$$\begin{aligned}
e(s) &= -N_s d\{\Phi_t(s)\}/dt \quad \text{(Eq. 13)}\\
&= -N_s d\{\exp(-\gamma \ell)\Phi_t(p)\}/dt\\
&= -N_s d\{\exp(-\gamma \ell)N_p i_t(p)/\mathfrak{R}\}/dt\\
&= -(N_s N_p/\mathfrak{R})d\{\exp(-\gamma \ell)i_t(p)\}/dt\\
&= -M d\{i_t(s)\}/dt\\
&= -j\omega M i_t(s).
\end{aligned}$$

The emf causes the current flow at the secondary, $i_r(s)$. The amount of the current is determined by the impedances of the secondary coil, the load, and the mutual inductance (see Eq. 2). The current $i_r(s)$ has the amplitude and the phase accordingly:

$$i_r(s) = j\omega M i_t(s)/(j\omega L_s + Z_L) = \Gamma i_t(s), \quad \text{(Eq. 14)}$$

where $\Gamma_L$ is the "reflection coefficient" of the current at the secondary side:

$$\Gamma_l = j\omega M/(j\omega L_S + Z_L). \tag{Eq. 15}$$

The amount of the reflection, hence the "reflection coefficient," is determined by the impedances and the mutual inductance. Note that in the physical sense, it is not the same kind of reflection as the one in the transmission line. The current $i_r(s)$ is not reflected to the primary, but is actually the current flowing at the secondary.

The current at the secondary, $i_r(s)$, will cause the mmf to be created at the secondary, hence a flux, $\Phi_r(s)$, opposite to the direction of the flux from the primary, $\Phi_t(s)$:

$$\Phi_r(s) = (N_s/\mathfrak{R}) i_r(s). \tag{Eq. 16}$$

Again, as the flux is in phase with the current, the phase of the flux $\Phi_r(s)$ will follow that of the current $i_r(s)$. Note that as the direction of the flux $\Phi_r(s)$ is opposite to that of $\Phi_t(s)$, $\Phi_r(s)$ is regarded as the "reflected" flux of $\Phi_t(s)$. In other words, $\Phi_t(p)$ is propagated through the magnetic core and arrives at the secondary as $\Phi_t(s)$, which causes the reflected flux $\Phi_r(s)$, and this reflected flux goes to the primary.

As the primary and the secondary are inductively coupled, the communication between the primary and the secondary is done by the flux, and the flux should contain the information regarding the secondary. As the flux is related to the current by the equation, $$\Phi_r(s) = (N_s/\mathfrak{R}) i_r(s), \tag{Eq. 17}$$

the current is converted to the flux with the conversion factor of $(N_s/\mathfrak{R})$. All of the electrical information except the phase change through the magnetic core is contained in (Eq. 1) and (Eq. 2). As the flux is related to the current through the conversion factor, the reflection coefficient of the flux should be as same as that of the current except the number of turns involved.

$$\begin{aligned}
\Phi_r(s)/\Phi_t(s) &= \Phi_r(s)/\{\exp(-\gamma\ell)\Phi_t(p)\} \\
&= \exp(\gamma\ell)\Phi_r(s)/\Phi_t(p) \\
&= \exp(\gamma\ell)[N_s i_r(s)/\{N_p i_t(p)\}] \\
&= \exp(\gamma\ell)(N_s/N_p) i_r(s)/\{\exp(\gamma\ell) i_t(s)\} \\
&= (N_s/N_p)\Gamma_L \\
&= n\Gamma_L.
\end{aligned} \tag{Eq. 18}$$

The voltage at the secondary becomes:

$$\begin{aligned}
v_2 &= N_s d\{\Phi_t(s) - \Phi_r(s)\}/dt \\
&= (j\omega N_s/\mathfrak{R})\{N_p i_t(s) - N_s i_r(s)\} \\
&= j\omega N_s N_p i_t(s)/\mathfrak{R} - j\omega N_s^2 i_r(s)/\mathfrak{R} \\
&= j\omega N_s N_p i_t(s)/\mathfrak{R} - j\omega L_s i_r(s) \\
&= j\omega M i_t(s) - j\omega M n i_r(s) \\
&= j\omega M\{i_t(s) - n i_r(s)\} \\
&= j\omega M\{\exp(-\gamma\ell) i_t(p) - n\Gamma_L i_t(s)\} \\
&= j\omega M\{\exp(-\gamma\ell) i_t(p) - \exp(-\gamma\ell) n\Gamma_L i_t(p)\} \\
&= j\omega M \exp(-\gamma\ell) i_t(p)(1 - n\Gamma_L),
\end{aligned} \tag{Eq. 19}$$

where the relation, $n = L_s/M$, is used for perfectly coupled case.

As the current at the secondary is generated according to the induced voltage, the impedance of the secondary coil, and the load, the information is transferred to the primary from the secondary by the reflection of the flux, and then the primary will "see" the load Z of the secondary. This process of reflection is continuously done as the primary "communicates" with the secondary, because the flux exchange is the only way of the communication between the primary and the secondary.

The flux $\Phi_t(s)$ causes the reflected flux $\Phi_r(s)$ at the secondary, and $\Phi_r(s)$ is in the opposite direction of the flux $\Phi_t(s)$ and comes back to the primary to become the flux $\Phi_r(p)$. Note that the attenuation and the phase change according to the propagation of the flux happen again when the flux $\Phi_r(s)$ propagates in the opposite direction. These changes are as same as the ones that happen when the flux goes from the primary to the secondary. Therefore, the phase change is equal to $(-\phi)$ as it should be as same as the one occurred during the forward direction. When $\Phi_r(s)$ arrives at the primary, it becomes $\Phi_r(p)$:

$$\begin{aligned}
\Phi_r(p) &= \exp(-\gamma\ell)\Phi_r(s) \\
&= \exp(-\gamma\ell) n\Gamma_L \Phi_t(s) \\
&= \exp(-2\gamma\ell) n\Gamma_L \Phi_t(p).
\end{aligned} \tag{Eq. 20}$$

Note that the current at the primary, $i_t(p)$, is related to the flux $\Phi_t(p)$ through $N_p$, but the current $i_r(p)$ is related to the flux at the secondary, $\Phi_r(s)$, through $N_s$. Therefore the ratio of the current $i_r(p)$ to $i_t(p)$ is not as same as that of $\Phi_r(p)$ to $\Phi_t(p)$, but has a different factor according to the different numbers of turns involved:

$$i_r(p) = \exp(-\gamma\ell) i_r(s) = \exp(-\gamma\ell)\Phi_r(s)\mathfrak{R}/N_s, \tag{Eq. 21}$$

$$i_t(p) = \Phi_t(p)\mathfrak{R}/N_p, \tag{Eq. 22}$$

$$\begin{aligned}
i_r(p)/i_t(p) &= \{\exp(-\gamma\ell)\Phi_r(s)/N_s\}/\{\Phi_t(p)/N_p\} \\
&= \exp(-\gamma\ell)(N_p/N_s)\{\Phi_r(s)/\Phi_t(p)\} \\
&= \exp(-2\gamma\ell) n\Gamma_L/n \\
&= \exp(-2\gamma\ell)\Gamma_L.
\end{aligned} \tag{Eq. 23}$$

The induced emf at the primary by the current $i_r(p)$ causes the voltage, $v_r(p)$, to become:

$$v_r(p) = M\{d(-i_r(p)/dt\} = -j\omega M i_r(p). \tag{Eq. 24}$$

The relations between voltages and currents are:

$$v_t(p) = j\omega L_p i_t(p), \tag{Eq. 25}$$

$$v_r(p) = -j\omega M i_r(p), \tag{Eq. 26}$$

$$i_r(p) = \exp(-\gamma\ell) i_r(s) = \exp(-\gamma\ell)\Gamma_L i_t(s) = \exp(-2\gamma\ell)\Gamma_L i_t(p), \tag{Eq. 27}$$

$$v_1 = v_p - i_t(p) Z_1 = v_t(p) + v_r(p) = j\omega L_p i_t(p) - j\omega M i_r(p). \tag{Eq. 28}$$

The above formula is rearranged as:

$$i_t(p)(j\omega L_p + Z_1) = v_p + j\omega M i_r(p), \tag{Eq. 29}$$

$$i_t(p) = v_p/(j\omega L_p + Z_1) + j\omega M i_r(p)/(j\omega L_p + Z_1). \tag{Eq. 30}$$

It says that the current at the primary is made of two parts: the first term is the source voltage divided by the sum of the impedances, $j\omega L_p$ and $Z_1$, and the second term is related to the "reflected" current coming from the secondary. Let $\{1/(j\omega L_p+Z_1)\}$ be:

$$\zeta = 1/(j\omega L_p+Z_1). \quad \text{(Eq. 31)}$$

Also, the coefficient of the current at the primary side, $\Gamma_S$, is defined as:

$$\Gamma_S = j\omega M/(j\omega L_p+Z_1). \quad \text{(Eq. 32)}$$

This coefficient, $\Gamma_S$, is a technical coefficient to describe the phenomenon in a circuit having a transformer. Then, $$i_t(p) = \zeta v_p + \Gamma_S i_r(p). \quad \text{(Eq. 33)}$$

The solution for $i_t(p)$ can be found by substituting $i_r(p)$ into the above equation:

$$i_r(p) = \exp(-2\gamma\ell)\Gamma_L i_t(p), \quad \text{(Eq. 34)}$$

$$i_t(p) = \zeta v_p + \exp(-2\gamma\ell)\Gamma_S \Gamma_L i_t(p), \quad \text{(Eq. 35)}$$

$$i_t(p)\{1 - \exp(-2\Gamma\ell)\Gamma_S \Gamma_L\} = \zeta v_p, \quad \text{(Eq. 36)}$$

$$i_t(p) = \zeta v_p / \{1 - \exp(-2\Gamma\ell)\Gamma_S \Gamma_L\}. \quad \text{(Eq. 37)}$$

Impedance of the circuit, $Z_p$, excluding the impedance $Z_1$, is:

$$\begin{aligned}
Z_p &= v_1/i_t(p) \quad &\text{(Eq. 38)} \\
&= \{v_t(p) + v_r(p)\}/i_t(p) \\
&= \{j\omega L_p i_t(p) - j\omega M i_r(p)\}/i_t(p) \\
&= j\omega L_p - j\omega M\{i_r(p)/i_t(p)\} \\
&= j\omega L_p - j\omega M \exp(-2\gamma\ell)\Gamma_L \\
&= j\omega L_p - j\omega M \exp(-2\gamma\ell)j\omega M/(j\omega L_s + Z_L) \\
&= j\omega L_p + \exp(-2\gamma\ell)\omega^2 M^2/(j\omega L_s + Z_L) \\
&= j\omega L_p + \exp(-2\alpha\ell)\exp(-j2\phi)\omega^2 M^2/(j\omega L_s + Z_L).
\end{aligned}$$

The expression for the impedance agrees with (Eq. 3) except the factor $\exp(-2\gamma\ell)$. It means that there is the attenuation as well as the phase change involved in the impedance of the transformer circuit. Note that the second term of the impedance has the factor $\exp(-j2\phi)$, and therefore, the impedance can be adjusted by controlling the relative phase of the flux. Impedance of the circuit, $Z_v$, including the impedance $Z_1$, is:

$$\begin{aligned}
Z_v &= v_p/i_t(p) \quad &\text{(Eq. 39)} \\
&= (1/\zeta)\{1 - \exp(2\gamma\ell)\Gamma_S\Gamma_L\} \\
&= (j\omega L_p + Z_1)[1 - \exp(-2\gamma\ell)\{j\omega M/(j\omega L_p + Z_1)\} \\
&\quad \{j\omega M/(j\omega L_s + Z_L)\}] \\
&= Z_1 + j\omega L_p + \exp(-2\gamma\ell)\omega^2 M^2/(j\omega L_s + Z_L) \\
&= Z_1 + j\omega L_p + \exp(-2\alpha\ell)\exp(-j2\phi)\omega^2 M^2/(j\omega L_s + Z_L).
\end{aligned}$$

(Eq. 1) is modified to encompass the phase change:

$$\begin{aligned}
v_1 &= j\omega L_p i_t(p) - j\omega M i_r(p) \quad &\text{(Eq. 40)} \\
&= j\omega L_p i_t(p) - j\omega M \exp(-2\gamma\ell)\Gamma_L i_t(p).
\end{aligned}$$

Note that in (Eq. 1) which describes the primary side, the current $i_p$ is actually $i_t(p)$).

2. Powers 2.1 Calculation of Powers

The power the source provides at the primary, $P_p$, is:

$$\begin{aligned}
P_p &= (1/2)\text{Re}\{v_1 i_t(p)^*\} \quad &\text{(Eq. 41)} \\
&= (1/2)\text{Re}[\{v_t(p) + v_r(p)\}i_t(p)^*] \\
&= (1/2)\text{Re}[\{j\omega L_p i_t(p) - j\omega M i_r(p)\}i_t(p)^*] \\
&= (1/2)\text{Re}[\{j\omega L_p i_t(p) - j\omega M \exp(-2\gamma\ell)\Gamma_L i_t(p)\}i_t(p)^*] \\
&= (1/2)|i_t(p)|^2\text{Re}\{j\omega L_p - j\omega M \exp(-2\gamma\ell)\Gamma_L\} \\
&= (1/2)\exp(-2\alpha\ell)|i_t(p)|^2\text{Re}[-j\omega M \exp\{j(\theta_\Gamma - \phi)\}|\Gamma_L|] \\
&= (1/2)\omega M \exp(-2\alpha\ell)|i_t(p)|^2|\Gamma_L|\text{Re}[-j\exp\{j(\theta_\Gamma - 2\phi)\}] \\
&= (1/2)\omega M \exp(-2\alpha\ell)|i_t(p)|^2|\Gamma_L|\sin(\theta_\Gamma - 2\phi),
\end{aligned}$$

where $\theta_\Gamma$ is the phase of $\Gamma_L$. Note that the sign of $P_p$ follows that of $\sin(\theta_\Gamma - 2\phi)$. It can become zero or even minus.

To calculate the power delivered at the load at the secondary, $P_L$ (Eq. 2) describing the secondary side is modified as follows:

$$Z_L i_r(s) = j\omega M i_t(s) - j\omega L_s i_r(s), \quad \text{(Eq. 42)}$$

$$\begin{aligned}
P_L &= (1/2)\text{Re}[\{j\omega M i_t(s) - j\omega L_s i_r(s)\}i_r(s)^*] \quad &\text{(Eq. 43)} \\
&= (1/2)\text{Re}[\{j\omega M \exp(-\gamma\ell)i_t(p) - j\omega L_s \exp(-\gamma\ell)\Gamma_L i_t(p)\} \\
&\quad \{\exp(-\gamma\ell)\Gamma_L i_t(p)\}^*] \\
&= (1/2)\exp(-2\alpha\ell)\omega|i_t(p)|^2 \text{Re}\{jM\Gamma_L^* - jL_s|\Gamma_L|^2\} \\
&= (1/2)\exp(-2\alpha\ell)\omega M|i_t(p)|^2|\Gamma_L|\sin\theta_\Gamma.
\end{aligned}$$

The power difference function between the power dissipated at the load at the secondary and that supplied by the source at the primary is:

$$\begin{aligned}
P_L - P_p &= (1/2)\exp(-2\alpha\ell)\omega M|i_t(p)|^2|\Gamma_L|\sin\theta_\Gamma - \quad &\text{(Eq. 44)} \\
&\quad (1/2)\omega M \exp(-2\alpha\ell)|i_t(p)|^2|\Gamma_L|\sin(\theta_\Gamma - 2\phi) \\
&= (1/2)\exp(-2\alpha\ell)\omega M|i_t(p)|^2|\Gamma_L|\{\sin\theta_\Gamma - \sin(\theta_\Gamma - 2\phi)\}.
\end{aligned}$$

From now on, to simplify the analysis, the attenuation is neglected. Although the attenuation factor, $\exp(-2\alpha\ell)$, is not explicitly expressed from hereon, it should be considered whenever necessary, and is easy to insert back into the equation. Since $i_t(p)$ is a function of $\Gamma_L$, and since the resistance of the source is usually real and small quantity, the followings are true at high frequencies:

$$\Gamma_S = j\omega M/(j\omega L_p + Z_1) \simeq M/L_p = n, \quad \text{(Eq. 45)}$$

$$i_t(p) = \zeta v_p/\{1 - \exp(-j2\phi)\Gamma_S\Gamma_L\}, \quad \text{(Eq. 46)}$$

$$\zeta = 1/(j\omega L_p + Z_1) \simeq 1/(j\omega L_p) = -j/(\omega L_p) \quad \text{(Eq. 47)}$$

$$\begin{aligned}
i_t(p) &= \zeta v_p/\{1 - \exp(-j2\phi)\Gamma_S\Gamma_L\} \quad &\text{(Eq. 48)} \\
&= \zeta v_p/[1 - \Gamma_S|\Gamma_L|\exp\{j(\theta_\Gamma - 2\phi)\}] \\
&\simeq -jv_p/[\omega L_p\{1 - n|\Gamma_L|\exp(j(\theta_\Gamma - 2\phi))\}],
\end{aligned}$$

-continued $$|i_t(p)|^2 = v_p^2 / [\omega^2 L_p^2 \{1 - 2n|\Gamma_L|\cos(\theta_\Gamma - 2\phi) + n^2|\Gamma_L|^2\}], \quad \text{(Eq. 49)}$$

$$P_L - P_p = (1/2)\omega M |i_t(p)|^2 |\Gamma_L| \{\sin\theta_\Gamma - \sin(\theta_\Gamma - 2\phi)\} \quad \text{(Eq. 50)}$$

$$= M v_p^2 |\Gamma_L| \{\sin\theta_\Gamma - \sin(\theta_\Gamma - 2\phi)\} /$$

$$[2\omega L_p^2 \{1 - 2n|\Gamma_L|\cos(\theta_\Gamma - 2\phi) + n^2|\Gamma_L|^2\}]$$

$$= n v_p^2 |\Gamma_L| \{\sin\theta_\Gamma - \sin(\theta_\Gamma - 2\phi)\} /$$

$$[2\omega L_p \{1 - 2n|\Gamma_L|\cos(\theta_\Gamma - 2\phi) + n^2|\Gamma_L|^2\}].$$

The denominator of the power difference function is non-negative as the following shows:

$$1 - 2n|\Gamma_L|\cos(\theta_\Gamma - 2\phi) + n^2|\Gamma_L|^2 \geq (1 - n|\Gamma_L|)^2 \geq 0. \quad \text{(Eq. 51)}$$

Therefore, if the denominator is not zero, the power difference function becomes positive if the following condition is satisfied:

$$\sin\theta_\Gamma - \sin(\theta_\Gamma - 2\phi) = 2\cos(\theta_\Gamma - \phi)\sin\phi \geq 0. \quad \text{(Eq. 52)}$$

It says that, the power difference function becomes positive, for example:
  if $\theta_\Gamma = 0$, and $\phi$ is in the first or the third quadrant, or
  if $\theta_\Gamma = \pi$, and $\phi$ is in the second or the fourth quadrant, or
  if $\theta_\Gamma = \pi/2$, $\phi$ can be any angle because the power difference function is always positive unless $\phi$ is $k\pi$, where k is an integer. In general, the phases with the difference of $2k\pi$ are treated as equal.

By controlling the relative phase $\phi$, it is possible to make the above condition be met for a given load and n, so that the power difference function becomes positive.

2.2 Power Calculation in case of High Frequencies

Now, some cases are to be examined. Let the load Z be:

$$Z_L = R_L + jX_L, \quad \text{(Eq. 53)}$$

where $R_L$ and $X_L$ are the resistance and the reactance at the secondary, respectively. Then, $$\Gamma_L = j\omega M / (j\omega L_s + Z_L) = \frac{\omega M(\omega L_s + X_L) + j\omega M R_L}{R_L^2 + (\omega L_s + X_L)^2}, \quad \text{(Eq. 54)}$$

$$\theta_\Gamma = \text{ATAN2}(\omega L_s + X_L, R_L), \quad \text{(Eq. 55)}$$

where ATAN2(x,y) is the arctangent function to return the angle in radians for given x and y values. The returned value lies between $(-\pi)$ to $\pi$, excluding $(-\pi)$. Since $R_L$ is positive, $$0 < \theta_\Gamma < \pi, \quad \text{(Eq. 56)}$$

$$|\Gamma_L| = |j\omega M / (j\omega L_s + Z_L)| \quad \text{(Eq. 57)}$$

$$= |j\omega M / (j\omega L_s + R_L + jX_L)|$$

$$= \omega M / \sqrt{R_L^2 + (\omega L_s + X_L)^2}.$$

The first case to examine is when at a high frequency, if $|\omega L_s + X_L| \gg R_L$, then, $$|\Gamma_L| \simeq \left|\frac{\omega M}{\omega L_s + X_L}\right|. \quad \text{(Eq. 58)}$$

$\Gamma_L$ becomes real.

If $(\omega L_s + X_L)$ is positive, then, $$\theta_\Gamma = 0^+, \quad \text{(Eq. 59)}$$

else $$\theta_\Gamma = \pi^-. \quad \text{(Eq. 60)}$$

In case when $\theta_\Gamma = 0+$, to find the condition that makes the power difference function maximal, it is differentiated with respect to $\phi$ and is set to zero:

$$\partial(P_L - P_p)/\partial\phi = 0, \quad \text{(Eq. 61)}$$

$$\cos(2\phi) = \frac{2n\Gamma_L}{1 + n^2\Gamma_L^2}. \quad \text{(Eq. 62)}$$

When the above value is put into the power difference function, it becomes:

$$P_L - P_p = \mp \frac{nv_p^2 \Gamma_L |1 - n^2\Gamma_L^2|}{2\omega L_p (1 - n^2\Gamma_L^2)^2}. \quad \text{(Eq. 63)}$$

But, usually $n\Gamma_L < 1$, and in that case, the power difference becomes:

$$P_L - P_p = \mp \frac{nv_p^2 \Gamma_L}{2\omega L_p (1 - n^2\Gamma_L^2)}, \quad \text{(Eq. 64)}$$

where minus sign is when $(2\phi)$ is at the fourth quadrant, and plus sign when $(2\phi)$ is at the first quadrant. Since it is desirable that the power difference is positive, $(2\phi)$ should be at the first quadrant where the maximum power difference occurs:

$$k\pi < \phi \leq \pi/4 + k\pi, \quad \text{(Eq. 65)}$$

where k is an integer. Note that the above condition for $\phi$ is only for the maximal power difference when the frequency is high. As it is the condition to make the power difference maximal, there may also exist other values of $\phi$ with a positive power difference, although the power difference function may not be maximal in those cases.

Next, in case when $\theta_\Gamma = \pi^-$, by differentiating with respect to $\phi$, the condition to make it zero is found:

$$\partial(P_L - P_p)/\partial\phi = 0, \quad \text{(Eq. 66)}$$

$$\cos(2\phi) = \frac{-2n|\Gamma_L|}{1 + n^2\Gamma_L^2}, \quad \text{(Eq. 67)}$$

$$P_L - P_p = \mp \frac{nv_p^2 |\Gamma_L||1 - n^2\Gamma_L^2|}{2\omega L_p (1 - n^2\Gamma_L^2)^2}, \quad \text{(Eq. 68)}$$

where minus sign is when $(2\phi)$ is at the second quadrant, and plus sign when $(2\phi)$ is at the third quadrant. Since the power difference needs to be positive, $(2\phi)$ should be at the third quadrant:

$$\pi/2 + k\pi < \phi \leq 3\pi/4 + k\pi, \quad \text{(Eq. 69)}$$

where k is an integer. Again, this is the condition for the maximal power difference. But the power difference function can be positive at other values of $\phi$, although not maximal in those cases.

So far, the case when $|\omega L_s + X_L| \gg R_L$ is considered, and in that case, the conditions for 0 when the power difference function becomes maximized are derived.

Now, what is interesting is when there is essentially only resistive load at high frequencies or when the frequency is substantially high. At high frequencies, if $$\omega L_s \gg |Z_L|, \quad \text{(Eq. 70)}$$

then $R_L$ and $X_L$ are negligible. Thus, $$\begin{aligned}\Gamma_L &= j\omega M / (j\omega L_s + Z_L) \\ &= \frac{\omega M(\omega L_s + X_L) + j\omega M R_L}{R_L^2 + (\omega L_s + X_L)^2} \\ &\simeq \frac{M}{L_s} \\ &= 1/n,\end{aligned} \quad \text{(Eq. 71)}$$

$$\theta_\Gamma = 0^+, \quad \text{(Eq. 72)}$$

$$\begin{aligned}P_L - P_p &= nv_p^2|\Gamma_L|\{-\sin(-2\phi)\}/ \\ &\quad [2\omega L_p\{1 - 2n|\Gamma_L|\cos(-2\phi) + n^2|\Gamma_L|^2\}] \\ &\simeq v_p^2\{\sin(2\phi)\}/[2\omega L_p\{1 - 2\cos(-2\phi) + 1\}] \\ &= v_p^2 \sin(2\phi)/[2\omega L_p\{2 - 2\cos(2\phi)\}] \\ &= v_p^2 \sin(2\phi)/[4\omega L_p\{1 - \cos(2\phi)\}] \\ &= v_p^2 2\sin\phi\cos\phi/(8\omega L_p \sin^2\phi) \\ &= v_p^2 \cos\phi/(4\omega L_p \sin\phi) \\ &= v_p^2 \cot\phi/(4\omega L_p).\end{aligned} \quad \text{(Eq. 73)}$$

It says that the power difference function becomes positive when $$(\omega L_s \gg |Z_L|) \text{ and } (k\pi < \phi < \pi/2 + k\pi), \quad \text{(Eq. 74)}$$

where k is an integer. In this case, the power difference is maximal when $\phi$ is close to $(k\pi + \varepsilon)$, where $\varepsilon$ is a very small positive quantity.

Another case to consider is when XL is close to $(-2\omega L_S)$ and when $(\omega L_s \gg R_L)$. Then, $$\Gamma_L \simeq L_s = \frac{-M}{L_s} - 1/n, \quad \text{(Eq. 75)}$$

$$\theta_L = \pi^-, \quad \text{(Eq. 76)}$$

$$\begin{aligned}P_L - P_p &= nv_p^2|\Gamma_L|\{-\sin(\pi - 2\phi)\}/ \\ &\quad [2\omega L_p\{1 - 2n|\Gamma_L|\cos(\pi - 2\phi) + n^2|\Gamma_L|^2\}] \\ &\simeq v_p^2\{-\sin(2\phi)\}/[2\omega L_p\{1 + 2\cos(2\phi) + 1\}] \\ &= -v_p^2 \sin(2\phi)/[2\omega L_p\{2 + 2\cos(2\phi)\}] \\ &= -v_p^2 \sin(2\phi)/[4\omega L_p\{1 + \cos(2\phi)\}] \\ &= -v_p^2 2\sin\phi\cos\phi/(8\omega L_p \cos^2\phi) \\ &= -v_p^2 \sin\phi/(4\omega L_p \cos\phi) \\ &= -v_p^2 \tan\phi/(4\omega L_p).\end{aligned} \quad \text{(Eq. 77)}$$

It says that the power difference function becomes positive when $X_L$ is close to $(-2\omega L_S)$ and when $$(\omega L_s \gg R_L) \text{ and } (\pi/2 + k\pi < \pi < \pi + k\pi), \quad \text{(Eq. 78)}$$

where k is an integer. In this case, the power difference is maximal when $\phi$ is close to $(\pi/2 + k\pi + \varepsilon)$.

The impedance of the circuit is a function of the phase of the flux, hence the power does change with the phase change occurred by the propagation of the flux. The analysis is done for a sine wave, but for other shapes of waves, the analysis can be done for each frequency using the Fourier transform in the same way.

3. Adjusting the Impedance by Phase Control

3.1 Some Example Cases

As the phase change is necessary, there are three ways and the combinations thereof to accomplish it: altering the path length of the magnetic core and/or using different frequencies and/or adding the reactive components. Here, the length of the core means the length of the magnetic core through which the flux goes from the primary to the secondary.

Changing the path length is a straightforward method, and does not require further explanation. Using higher frequencies than 50 Hz of the common electric power supply might be more preferable than changing the core length in most cases.

Impedance of the circuit from (Eq. 38), $Z_p$, excluding the impedance of the voltage source, without attenuation, is shown to be:

$$Z_p = j\omega L_p + \exp(-j2\phi)\chi^2 M^2/(j\omega L_s + Z_L). \quad \text{(Eq. 79)}$$

To examine the effect of the added phase factor, $\exp(-j2\phi)$, simple cases are examined assuming no significant serial impedance attached to the power source at the primary side, unless otherwise stated. Neglecting primary side impedance is a reasonable approximation when the frequency is high, as $\omega L_p$ is far larger than the small serial impedance at the primary side. Then, the phase of the primary side only is the phase of the primary coil impedance, $j\omega L_p$, and is $\pi/2$. Let the term $\omega^2 M^2/(Z_L + j\omega L_s)$ be:

$$A = |A|\exp(j\theta_A) = \omega^2 M^2/(Z_L + j\omega L_s), \quad \text{(Eq. 80)}$$

where $\theta_A$ is the phase of A. Then $\theta_A$ has the following relation with $\theta_\Gamma$:

$$\theta_\Gamma = \theta_A + \pi/2. \quad \text{(Eq. 81)}$$

Then, the impedance expression becomes:

$$Z_p = j\omega L_p + \exp(-j2\phi)|A|\exp(j\theta_A) = j\omega L_p + |A|\exp\{j(\theta_A - 2\phi)\}. \quad \text{(Eq. 82)}$$

There are some cases to consider.

1) In this first case, it is assumed that the load is resistive only:

$$X_L = 0, \quad \text{(Eq. 83)}$$

$$Z = R_L. \quad \text{(Eq. 84)}$$

When the term, $|A|\exp\{j(\theta_A - 2\phi)\}$, has the phase of $(-\pi/2)$, $$\theta_A - 2\phi = -2k\pi - \pi/2, \quad \text{(Eq. 85)}$$

$$\theta_\Gamma - \pi/2 - 2\phi = -2k\pi - \pi/2, \quad \text{(Eq. 86)}$$

$$\theta_\Gamma - 2\phi = -2k\pi, \quad \text{(Eq. 87)}$$

$$\phi = \theta_A/2 + k\pi + \pi/4 = \theta_\Gamma/2 + k\pi, \quad \text{(Eq. 88)}$$

where k is an integer. In this case, $Z_p$ and $\theta_p$ become:

$$Z_p = j\omega L_p + |A|\exp\{j(\theta_A - 2\phi)\} = j\omega L_p - |A| = j(\omega L_p - |A|), \quad \text{(Eq. 89)}$$

$$\theta_p = \pi/2 \text{ if } \omega L_p > |A|, \quad \text{(Eq. 90)}$$

$$\theta_p = -\pi/2 \text{ if } \omega L_p < |A|. \quad \text{(Eq. 91)}$$

Either case, the power factor is zero, which means that the power the source provides at the primary is none. When $\omega L_s \gg |Z_L|$, $\Gamma_L$ is $(1/n)$, and the power difference function becomes:

$$P_L - P_p = v_p^2 \cot \phi / (4\omega L_p). \tag{Eq. 92}$$

The relative phase $\phi$ is assumed to be proportional to the length of the magnetic core as in (Eq. 10), and also to the frequency f in the ideal case of constant phase velocity v at all frequencies as follows:

$$\phi = 2\pi f \ell / v. \tag{Eq. 93}$$

In general, the relative phase, $\phi$, increases as the frequency increases. When the length of the core is long enough, the frequency can be low to have the necessary phase change of $(-\phi)$. It is also possible to have a necessary phase change making the power factor to a desired value when one coil is wound over the other on the same core in a transformer.

The impedance of the circuit can be adjusted and hence the power factor can be made zero. This happens, for the case of power factor of zero, because the flux coming from the secondary delivers the "false" information on the phase of the load to the primary as if the secondary has only the reactive components. Of course, the secondary might have some real resistive load, but as the phase is changed while the flux is propagating, the primary is "deceived" by "seeing" the changed phase.

Therefore, although the source sends the power with the power factor of zero to the secondary, when the secondary receives the flux, it can generate necessary emf from the flux coming from the primary and the current is generated according to the impedance of the secondary. Although the power with the power factor of zero is sent, the circuit works even with a resistive load at the secondary.

2) In this second case, the conditions are as same as above, except that $\omega L_p = |A|$. It can happen, for instance, when Z is neglected and the following condition is satisfied:

$$M^2 = c^2 L_p L_s = L_p L_s, \tag{Eq. 94}$$

which is when there is a perfect coupling with the coupling coefficient of c=1. In reality, as there is no perfect coupling, if $Z_L$ contains some appropriate amount of reactance, then the condition, $\omega L_p = |A|$, can be met. For instance, if $\sigma^2 = 0.9$, by inserting a capacitor in series having the capacitance value of a bit smaller than $\{10/(\omega^2 L_s)\}$, then the total reactance at the secondary becomes almost equal to $0.9\omega L_s$. And if a proper amount of small resistance is added, then the condition of $\omega L_p = |A|$ can be satisfied.

As the impedance, $Z_p$, becomes zero, the circuit behaves like the series LC resonant circuit. In the series LC resonant circuit, as the frequency is changed from low to high through the resonance frequency, the circuit behavior changes from capacitive to inductive. In this circuit, however, the frequency is fixed to satisfy the following condition:

$$\theta_A - 2\phi = \pi(-2k - \tfrac{1}{2}). \tag{Eq. 95}$$

Therefore, the phase of the impedance of this circuit changes from $(\pi/2)$ to $(-\pi/2)$ as the value of $|A|$ varies in the vicinity of the value of $\omega L_p$.

3) In this third case, a capacitor is attached in series to the primary coil as in FIG. 2 so that the primary coil ($L_p$) and the capacitor ($C_f$) are in resonance, and assume that the following condition is met at the resonance angular frequency $\omega_0$:

$$\theta_A - 2\phi = -2k\pi - \pi, \tag{Eq. 96}$$

$$\phi = \theta_A/2 + k\pi + \pi/2, \tag{Eq. 97}$$

where k is an integer.

FIG. 2 shows an LC resonant circuit at the primary in a transformer circuit.

The capacitance is as follows:

$$C_f = \frac{1}{\omega_0^2 L_p}. \tag{Eq. 98}$$

The combined impedance of $L_p$ and $C_f$ becomes zero at the resonance angular frequency $\omega_0$ when $C_f$ and $L_p$ have the same magnitude of impedance. Then the circuit part comprised of the capacitor and the inductor of the primary disappears from the expression of the impedance:

$$Z_p = \exp(-j2\phi)|A|\exp(j\theta_A) = |A|\exp\{j(\theta_A - 2\phi)\}. \tag{Eq. 99}$$

In other words, the phase of the circuit, $\theta_A - 2\phi$, can be controlled to any desired value as the relative phase, $\phi$, is changed. When $(\theta A - 2\phi)$, is $(-\pi)$, the impedance becomes:

$$Z_p = \exp(-j2\phi)|A|\exp(j\theta_A) = -|A|, \tag{Eq. 100}$$

giving a negative resistance value. It means that the phase of the current is $\pi$ relative to that of the voltage. The power at the primary becomes negative, meaning that the power flows backward at the primary.

Note that the negative resistance is not the only case when the power at the primary becomes negative on the average. When the phase of the impedance of the circuit is at the second or at the third quadrant, the active power at the primary is negative.

As will be shown in the "general solution" section, the condition, $\theta_A - 2\phi = -2k\pi - \pi$, which is the condition for negative resistance, can be realized if the condition, $$\omega L_p < |A|, \tag{Eq. 101}$$

is satisfied. In that case, it does not need a capacitor to be attached to have the negative resistance. But this is given as an example to see the properties of the circuit. In case the capacitor is attached, as the primary coil disappears from the expression of the impedance at the resonance angular frequency, $\omega = \omega_0$, the followings are true:

$$\zeta = \frac{1}{Z_1 + (1/j\omega_0 C_f) + j\omega_0 L_p} = 1/Z_1, \tag{Eq. 102}$$

$$\Gamma_S = \frac{j\omega_0 M}{Z_1 + (1/j\omega_0 C_f) + j\omega_0 L_p} = j\omega_0/M/Z_1, \tag{Eq. 103}$$

$$\theta_A - 2\phi = \pi(-2k - 1), \tag{Eq. 104}$$

$$\theta_\Gamma - 2\phi = \theta_A + \pi/2 - 2\phi = \pi(-2k - 1/2), \tag{Eq. 105}$$

$$\phi = \theta_\Gamma/2 + \pi(k + 1/4), \tag{Eq. 106}$$

$$\phi = \theta_A/2 + \pi(k + 1/2), \tag{Eq. 107}$$

$$\begin{aligned} i_t(p) &= \zeta v_p / \{1 - \exp(-j2\phi)\Gamma_S \Gamma_L\} \\ &= \zeta v_p / [1 - \Gamma_S |\Gamma_L| \exp\{j(\theta_\Gamma - 2\phi)\}] \\ &\simeq v_p / (Z_1\{1 - (j\omega_0 M/Z_1)|\Gamma_L| \exp(j(\theta_\Gamma - 2\phi))\}] \\ &= v_p / (Z_1 + j\omega_0 M j |\Gamma_L|) \\ &= v_p / (Z_1 - \omega_0 M |\Gamma_L|) \\ &\simeq -v_p / (\omega_0 M |\Gamma_L|). \end{aligned} \tag{Eq. 108}$$

The final expression is when $Z_1$ is neglected. Note that the current, $i_t(p)$, flows in the opposite direction at the primary.

$$P_p = (1/2)\omega_0 M |i_t(p)|^2 |\Gamma_L| \sin(\theta_\Gamma - 2\phi) \qquad \text{(Eq. 109)}$$
$$= -v_p^2/(2\omega_0 M |\Gamma_L|) < 0,$$

$$P_L = (1/2)\omega_0 M |i_t(p)|^2 |\Gamma_L| \sin\theta_\Gamma \qquad \text{(Eq. 110)}$$
$$= v_p^2 \sin\theta_\Gamma/(2\omega_0 M |\Gamma_L|) > 0.$$

$P_L - P_p > 0$, and $P_p < 0$, which means that the power is not only dissipated at the load at the secondary but also flows backward at the primary, and the power consumed at the load at the secondary is larger than that provided at the primary.

Here, $Z_1$ can be regarded as the working load of the circuit at the primary side. Note that the load at the secondary still works. Therefore, the loads can be at the primary side as well as at the secondary side. Of course, the value of $Z_1$ can be zero, meaning that no resistor is attached at the primary side.

As already mentioned, although the capacitor in FIG. 2 is not there, the negative resistance can be realized if the condition, $\omega L_p < |A|$, is met. In that case, $Z_1$ can still be regarded as a load at the primary side.

Of course, the capacitor can be attached to the secondary side which matches the secondary coil inductance for a certain resonant frequency, as it does in the primary.

4) In this fourth case, it is assumed that the load is as follows:

$$Z_L = R_L + jX_L = R_L - R_L - j2\omega L_s. \qquad \text{(Eq. 111)}$$

When the term, $|A|\exp\{j(\theta_A - 2\phi)\}$, has the phase of $\pi/2$, $$\theta_A - 2\phi = -2k\pi - 3\pi/2, \qquad \text{(Eq. 112)}$$

$$\theta_\Gamma - \pi/2 - 2\phi = -2k\pi - 3\pi/2, \qquad \text{(Eq. 113)}$$

$$\theta_\Gamma - 2\phi = -2k\pi - \pi, \qquad \text{(Eq. 114)}$$

$$\phi = \theta_\Gamma/2 + k\pi + \pi/2, \qquad \text{(Eq. 115)}$$

where k is an integer. In this case, $Z_p$ and $\theta_p$ become:

$$Z_p = j\omega L_p + |A|\exp\{j(\theta_A - 2\phi)\} = j\omega L_p + j|A| = j(\omega L_p + |A|), \qquad \text{(Eq. 116)}$$

$$\theta_p = \pi/2. \qquad \text{(Eq. 117)}$$

The power factor is zero, which means that the power at the primary that the source provides is none. When the frequency is high so that $\omega L_s \gg R_L$, $$\Gamma_L = -1/n, \qquad \text{(Eq. 118)}$$

$$\theta_\Gamma = \pi^-, \qquad \text{(Eq. 119)}$$

$$P_L - P_p = -v_p^2 \tan\phi/(4\omega L_p). \qquad \text{(Eq. 120)}$$

In this case, the power difference function becomes positive, as $\phi$ is between $\pi/2$ and $\pi$, but is not the maximal power difference case.

This completes the section regarding the method of phase change using high frequencies.

3.2 Adding Reactive Component(s)

In general, by adding resistor(s) and/or reactive component(s), the phase of the circuit can be changed. But the load is usually resistive, and it is assumed that the value of the resistor is already fixed by the requirement of the load. Or the value of the resistor can be determined to make the power at the load to be positive or maximal under the condition that the power difference function becomes positive or maximal. Therefore, adding the reactance component(s) will help minimize the phase change to be done by changing the frequency and/or by changing the length of the magnetic core.

Let the impedances of the primary and the secondary in the absence of the mutual inductance M be $Z_A$ and $Z_B$, respectively.

$$Z_A = R_A + jX_A, \qquad \text{(Eq. 121)}$$

$$Z_B = R_B + jX_B. \qquad \text{(Eq. 122)}$$

where R's and X's are the resistances and the reactances, respectively. Note that X's include the reactances of the transformer coils. The unchanged impedance of the circuit, $Z_U$, before adding the reactive component(s), is:

$$Z_U = R_A + jX_A + \exp(-j2\phi)\omega^2 M^2/(R_B + jX_B) \qquad \text{(Eq. 123)}$$
$$= R_A + jX_A + |B|\exp\{j(\theta_B - 2\phi)\},$$

where $$|B| = \omega^2 M^2/\sqrt{R_B^2 + X_B^2}, \qquad \text{(Eq. 124)}$$

$$\theta_B = A\ \text{TAN}\ 2(R_B, -X_B). \qquad \text{(Eq. 125)}$$

Let the extra reactance, $X_E$, be added to the load at the secondary to change the phase. Let the combined reactance at the secondary side, $X_C$, be:

$$X_C = X_B + X_E. \qquad \text{(Eq. 126)}$$

Then the changed impedance, $Z_C$, becomes:

$$Z_C = R_A + jX_A + \exp(-j2\phi)\omega^2 M^2/(R_B + jX_C) \qquad \text{(Eq. 127)}$$
$$= R_A + jX_A + \exp(-j2\phi)C$$
$$= R_A + jX_A + |C|\exp\{j(\theta_C - 2\phi)\},$$

where $$|C| = \omega^2 M^2/\sqrt{R_B^2 + X_C^2}, \qquad \text{(Eq. 128)}$$

$$\theta_C = A\ \text{TAN}\ 2(R_B, -X_C). \qquad \text{(Eq. 129)}$$

The phase change, $\Delta\theta$, by adding the extra reactance, is:

$$\Delta\theta = \theta_C - \theta_B = A\ \text{TAN}\ 2(R_B, -X_C) - A\ \text{TAN}\ 2(R_B, -X_B). \qquad \text{(Eq. 130)}$$

The ratio of the magnitude change of the secondary impedances referred to the primary, $r_{CB}$, is:

$$r_{CB} = |C|/|B| = \sqrt{(R_B^2 + X_B^2)/(R_B^2 + X_C^2)}. \qquad \text{(Eq. 131)}$$

To illustrate the effect of adding a reactive component, let us consider a case with the mutual inductance M, with some additional simplifications:

$$R_A = 0, \qquad \text{(Eq. 132)}$$

$$X_A = \omega L_A = \omega L_B = X_B = \omega(10\ \text{mH}), \qquad \text{(Eq. 133)}$$

where $L_A$ and $L_B$ are the primary and the secondary self-inductances, respectively. Also, let the secondary have only the resistor, $R_B = 100\Omega$, as the load. The frequency is set to $f = 1$ kHz. Then the unchanged impedance, $Z_U$, is:

$$Z_U = j\omega L_A + \exp(-j2\phi)\omega^2 M^2/(R_B + j\omega L_B) \qquad \text{(Eq. 134)}$$
$$= j\omega L_A + \exp(-j2\phi)B,$$

$$|B| = \omega^2 M^2 \Big/ \sqrt{R_B^2 + \omega^2 L_B^2} \qquad \text{(Eq. 135)}$$

$$= \omega^2 M^2 \Big/ \sqrt{100^2 + (2\pi * 1000 * 0.01)^2}$$

$$= \omega^2 M^2 / 118.1 \Omega,$$

$$\theta_B = \arctan(-\omega L_B / R_B) \qquad \text{(Eq. 136)}$$

$$= \arctan(-62.8/100)$$

$$= -0.561 \text{ rad}.$$

When the relation, $\theta_B - 2\phi = -\pi/2$, is to be satisfied, the relative phase, $\phi_B$, should be:

$$\phi_B = \theta_B/2 + \pi/4 = -0.561/2 + \pi/4 = 0.505 \text{ rad}. \qquad \text{(Eq. 137)}$$

Let us add an inductor with inductance of 5 mH, to the load. Then, $$X_C = \omega L_B + 0.005\omega = 0.015\omega \Omega, \qquad \text{(Eq. 138)}$$

$$Z_C = j\omega L_A + \exp(-j2\phi)\omega^2 M^2 (R_B - jX_C)/(R_B^2 + X_C^2), \qquad \text{(Eq. 139)}$$

$$|C| = \omega^2 M^2 \Big/ \sqrt{R_B^2 + X_C^2} \qquad \text{(Eq. 140)}$$

$$= \omega^2 M^2 \Big/ \sqrt{100^2 + (2\pi * 1000 * 0.015)^2}$$

$$= \omega^2 M^2 / 137.4 \Omega,$$

$$\theta_C = \arctan(-X_C / R_B) \qquad \text{(Eq. 141)}$$

$$= \arctan(-94.25/100)$$

$$= -0.756 \text{ rad},$$

$$\Delta \theta = \theta_C - \theta_B = -0.756 - (-0.561) = -0.195 \text{ rad}, \qquad \text{(Eq. 142)}$$

$$r_{CB} = |C|/|B| = 118.1/137.4 = 0.86. \qquad \text{(Eq. 143)}$$

The relative phase, $\phi_C$, should be:

$$\phi_C = \theta_C/2 + \pi/4 = -0.756/2 + \pi/4 = 0.407 \text{ rad}. \qquad \text{(Eq. 144)}$$

Thus, by adding an extra reactive component, the phase of the system changes by the amount of (−0.195)rad. Also, the magnitude of the secondary impedance referred to the primary changes accordingly. The combination of not only changing the length of the core and/or adjusting the frequency but also adding the reactive components can help find the optimal phase to satisfy the phase condition that should be achieved. In this example, the reactive component is added at the secondary side, but it can be added at the primary side also, and can cause the necessary phase change. The case 3) of the section "3.1 Some Example Cases," can be regarded as the case when a reactive component, a capacitor, is added at the primary side, thus changes the phase of the circuit.

Note that there is a way to convert a serial configuration to a parallel one, and vice versa. Therefore, although only serial or parallel configurations are shown as examples, the same principles about the power and the impedance can be applicable also to the corresponding parallel or serial configurations, respectively. (reference: Michael Tse, Lecture Note on EIE403: High Frequency Circuit Design, Hong Kong Polytechnic University, accessed Sep. 4, 2017, http://cktse.eie.polyu.edu.hk/eie403/impedancematching.pdf.)

4. General Solution

4.1 Proof

So far, some example cases examining the behavior of the circuit have been treated. In general, however, the phase of the circuit can be adjusted as the phase in the impedance expression, $\theta_A - 2\phi$, can be controlled.

Assume that a component with the impedance $Z_e$ is added at the primary side. The primary coil impedance, $j\omega L_p$, is absorbed in the expression of the impedance of the primary, $Z_f$, in the absence of the mutual inductance:

$$Z_f = j\omega L_p + Z_e = R_1 + jX_1, \qquad \text{(Eq. 145)}$$

where $R_1$, and $X_1$ are the resistance and the reactance of the primary, respectively. The impedance of the circuit, $Z_v$, is written as:

$$Z_v = R_1 + jX_1 + \exp(-2\alpha\ell)\exp(-j2\phi)\omega^2 M^2/(R_2 + jX_2) \qquad \text{(Eq. 146)}$$

$$= Z_f + |E|\exp\{j(\theta_E - 2\phi)\}$$

$$= |Z_v|\exp(j\theta_v),$$

where $R_2$ and $X_2$ are the resistance and the reactance of the secondary including the secondary coil reactance, respectively, and $\theta_v$ is the phase of $Z_v$. E is as follows:

$$E = \exp(-2\alpha\ell)\omega^2 M^2/(R_2 + j\omega_2). \qquad \text{(Eq. 147)}$$

Let $\theta_E$ and $\theta_f$ be the phases of E and $Z_f$, respectively. Then, $$|Z_v| = \sqrt{|Z_f|^2 + |E|^2 + 2|Z_f||E|\cos(\theta_E - 2\phi - \theta_f)}, \qquad \text{(Eq. 148)}$$

$$\theta_v = A \text{ TAN } 2\{|Z_f|\cos \theta_f + |E|\cos(\theta_E - 2\phi), |Z_f|\sin \theta_f + |E|\sin(\theta_E - 2\phi)\}. \qquad \text{(Eq. 149)}$$

It is shown below that there is a relative phase $\phi$ that makes the phase of the impedance of the circuit, $\theta_v$, have any desired value between $-\pi$ and $\pi$ when $|E| > |Z_f|$. The phase $\theta_v$ can become $\pi$, and then it is the case of negative resistance. It is also shown below that if $|E| < |Z_f|$, then by controlling the relative phase $\phi$, $\theta_v$ can have a value within a certain range. The case when $|E| = |Z_f|$ is to be dealt with also.

Let us represent the impedance as follows:

$$Z_v = Z_f + |E|\exp\{(j(\theta_E - 2\phi)\} = |Z_v|\exp(j\theta_v) = \text{Re}(Z_v) + j\text{Im}(Z_v), \qquad \text{(Eq. 150)}$$

where Re and Im mean real and imaginary parts, respectively. Let the impedance be represented in the Cartesian coordinate system with its x and y values as the real and imaginary parts, respectively. Let $Z_v$ and $Z_f$ be represented as the vectors $\overline{Z}_v$ and $\overline{Z}_f$ in the Cartesian coordinate system, with corresponding coordinates as $(x_v, y_v)$ and $(x_f, y_f)$, respectively.

$$x_v = \text{Re}(Z_v) = |Z_f|\cos \theta_f + |E|\cos(\theta_E - 2\phi), \qquad \text{(Eq. 151)}$$

$$y_v = \text{Im}(Z_v) = |Z_f|\sin \theta_f + |E|\sin(\theta_E - 2\phi), \qquad \text{(Eq. 152)}$$

$$|Z_v| = \sqrt{x_v^2 + y_v^2}, \qquad \text{(Eq. 153)}$$

$$\theta_v = A \text{ TAN } 2(x_v, y_v). \qquad \text{(Eq. 154)}$$

FIG. 3 shows the impedance representation in the Cartesian coordinate. $\xi$ is the angle between the vectors $\overline{Z}_f$ and $\overline{E}$.

Let the term E exp(−j2φ) be represented as the vector $\overline{E}$ in the Cartesian coordinate system. Then all the points of E constitute a circle with its center at $(x_f, y_f)$, and its equation is:

$$(x - x_f)^2 + (y - y_f)^2 = r^2, \qquad \text{(Eq. 155)}$$

where $$r = |E|. \qquad \text{(Eq. 156)}$$

Then $(x_v, y_v)$ lies on the circumference of the circle. The minimum or the maximum angle that $\theta_v$ can have is determined by the line when the vector $\overline{Z}_v$ is tangential to the circle, as denoted in the dotted lines in FIG. 3. There are two such lines when $\overline{Z}_v$ is tangential to the circle, in general. Let the point that Z, meets tangentially to the circle be $(x_0, y_0)$ and let the tangential line be:

$$y = ax, \quad \text{(Eq. 157)}$$

where $$a = y_0/x_0, \quad \text{(Eq. 158)}$$

which is the slope of the linear function. Then, $$(x_0-x_f)^2 + (ax_0-y_f)^2 = r^2, \quad \text{(Eq. 159)}$$

$$(a^2+1)x_0^2 - 2(ay_f+x_f)x_0 + x_f^2 + y_f^2 - r^2 = 0. \quad \text{(Eq. 160)}$$

The tangent line meets the circle at only one point, so the determinant, D/4, should be zero:

$$D/4 = (ay_f+x_f)^2 - (a^2+1)(x_f^2+y_f^2-r^2) = 0, \quad \text{(Eq. 161)}$$

$$a^2(x_f^2-r^2) - 2ax_fy_f + y_f^2 - r^2 = 0. \quad \text{(Eq. 162)}$$

Solving for a, $$a = \frac{x_f y_f \pm \sqrt{x_f^2 y_f^2 - (x_f^2 - r^2)(y_f^2 - r^2)}}{(x_f^2 - r^2)} = \frac{x_f y_f \pm r\sqrt{x_f^2 + y_f^2 - r^2}}{(x_f^2 - r^2)}. \quad \text{(Eq. 163)}$$

If $x_f^2 + y_f^2 < r^2$, there is no solution for a, which means that there is no tangent line available. It is when $|Z_f| < |E|$, and in that case, the origin (0, 0) lies inside the circle, hence, $(x_v, y_v)$ can be in any quadrant. Therefore, $\theta_v$ can have any phase value. In other words, the phase of the circuit impedance, $\theta_v$, can have any value by controlling the relative phase $\phi$.

If $x_f^2 + y_f^2 > r^2$, there are two solutions for a, and therefore the phase $\theta_v$ can have minimum as well as maximum values, $\theta_{vm}$ and $\theta_{vM}$, respectively. The vector from the center of the circle, $(x_f, y_f)$, to the point $(x_0, y_0)$ becomes orthogonal with the tangent line. Therefore, $$a\frac{y_0 - y_f}{x_0 - x_f} = -1, \quad \text{(Eq. 164)}$$

$$x_0 = \frac{x_f + ay_f}{a^2 + 1}. \quad \text{(Eq. 165)}$$

Let those two solutions of a be $a_1$ and $a_2$. Then there are two sets of coordinates $(x_{01}, y_{01})$ and $(x_{02}, y_{02})$ corresponding to $a_1$ and $a_2$, respectively. Then $\theta_{vm}$ and $\theta_{vM}$ are determined as:

$$\theta_{vm} = \min\{A\,TAN\,2(x_{01},y_{01}), A\,TAN\,2(x_{02},y_{02})\}, \quad \text{(Eq. 166)}$$

$$\theta_{vM} = \max\{A\,TAN\,2(x_{01},y_{01}), A\,TAN\,2(x_{02},y_{02})\}. \quad \text{(Eq. 167)}$$

Therefore, the phase of $Z_v$ can have any value from $\theta_{vm}$ to $\theta_{vM}$. And the magnitude of $Z_v$ is also determined accordingly.

If $x_f^2 + y_f^2 = r^2$, there is only one point (0, 0) where $\overline{Z}_v$ is tangential to the circle. It is when $|E| = |Z_f|$. Among the possible solutions in this case, one particular solution $(x_v, y_v) = (0, 0)$, is when the impedance becomes zero:

$$Z_v = 0 + j0 = 0. \quad \text{(Eq. 168)}$$

In conclusion, for a given $|Z_v|$ and $\theta_v$, the circuit can be designed by finding the appropriate values for $Z_f$ and E and $\phi$. From the proof, it is shown that if $|E| > |Z_f|$, then $Z_v$ can be designed with any desired power factor. The relative phase $\phi$ is controlled by those three methods mentioned: adjusting the length of the magnetic core, and/or changing the frequency, and/or adding reactive component(s). Not only $\theta_v$ can be controlled, but it can also be set to any desired value, if the condition, $|E| > |Z_f|$, is met. Thus, the power factor, $\cos\{ATAN2(x_v, y_v)\}$, can be controlled. Note that ATAN2 $(x_v, y_v)$ can be from $(-\pi)$ to $\pi$, and the power factor can be anywhere from −1 to 1 if appropriate conditions are met as discussed. Likewise, the magnitude of the impedance of the circuit, $|Z_v|$, can be determined accordingly.

Note that this is for the ideal case when the value of $|E|$ does not change with the frequency. In reality, the values of the mutual inductance and the attenuation factor, M and $\exp(-2\alpha\ell)$, respectively, change according to the frequency. Therefore, the values of $|E|$ are not the same for all the frequencies, and the points $(x_v, y_v)$ might not constitute a perfect circle.

4.2 Method of estimating the relative phase

Now, let us find a way to measure the relative phase of the flux, $\phi$, when performing an experiment. From the experimental data, the magnitude of the impedance of $|Z_v|$ is calculated as:

$$|Z_v| = v_1(rms)/i_p(rms), \quad \text{(Eq. 169)}$$

where $v_1(rms)$ and $i_p(rms)$ are the rms values of the voltage and the current at the primary coil, respectively. The power at the primary coil, $P_p$, is obtained through the math function of the oscilloscope by measuring the mean of the products of $v_1$ and $i_p$ values or by directly measuring it using a power analyzer. In general, using a power analyzer, however, is more accurate than measuring with an oscilloscope. The phase of the impedance, $\theta_v$, is as follows:

$$\theta_v = a\cos[P_p/\{v_1(rms)i_p(rms)\}], \quad \text{(Eq. 170)}$$

where a cos is the arccosine function. $|Z_f|$ and $\theta_f$ are calculated as follows:

$$|Z_f| = \sqrt{R_1^2 + X_1^2} \quad \text{(Eq. 171)}$$

$$\theta_f = A\,TAN\,2(R_1, X_1). \quad \text{(Eq. 172)}$$

$|E|$ is calculated as follows:

$$|E| = \exp(-2\alpha\ell)\omega^2 M^2 \sqrt{R_2^2 + X_2^2}. \quad \text{(Eq. 173)}$$

The area of the triangle with vertices (0,0), $(x_f, y_f)$ and $(x_v, y_v)$ in FIG. 3 has the following relation:
If $\theta_v > \theta_f$, $$(\tfrac{1}{2})|Z_v||Z_f|\sin(\theta_v - \theta_f) = (\tfrac{1}{2})|Z_f||E|\sin\xi, \quad \text{(Eq. 174)}$$

where $\xi$ is the angle between the vectors $\overline{Z}_f$ and $\overline{E}$, and is a positive quantity. The relative phase $\phi$ is determined as follows:

$$\theta_E - 2\phi = \theta_f + \pi - \xi, \quad \text{(Eq. 175)}$$

$$\phi = (\theta_E - \theta_f + \xi - \pi)/2. \quad \text{(Eq. 176)}$$

For the other case of the relation between $\theta_v$ and $\theta_f$ can be solved in the same way.

Relative phase of the flux, $\phi$, can also be estimated using the power at the primary provided by the source, as it is related with the relative phase:

$$P_p = (\tfrac{1}{2})\exp(-2\alpha\ell)\omega M|i_r(p)|^2|\Gamma_L|\sin(\theta_\Gamma - 2\phi), \quad \text{(Eq. 177)}$$

where $i_t(p)$ is the primary input current, and the value $(½)|i_t(p)|^2$ is obtained from the rms value of the primary input current, $i_p$ (rms):

$$(½)|i_t(p)|^2 = i_p^2 (\text{rms}). \quad \text{(Eq. 178)}$$

The attenuation factor, $\exp(-2\alpha\ell)$, can be determined by the following relation:

$$P_L = (½)\exp(-2\alpha\ell)\omega M|i_t(p)|^2 \Gamma_L |\sin\theta_\Gamma = v_2(\text{rms})^2/R_2, \quad \text{(Eq. 179)}$$

where $R_2$ and $v_2$ are the resistance and the voltage at the load at the secondary, respectively.

5. Imperfect Transformer

5.1 Single Phase Imperfect Transformer

An equivalent circuit of a single phase imperfect transformer is as follows (reference: Bleaney and Bleaney, *Electricity and Magnetism*, 251.)

FIG. 4 shows a circuit of a single phase imperfect transformer.
where
- $v_p$ is the alternating supply voltage of the angular frequency $\omega$,
- $c = M/\sqrt{L_p L_s}$, is the coupling coefficient, where M, $L_p$ and $L_s$ are the mutual inductance, and the primary and the secondary self-inductances, respectively,
- $R_c$ is the core loss resistance,
- $X_m = c\omega L_p$, is the magnetizing reactance,
- $Z_1$ is the impedance of the primary side including the primary resistance and the primary leakage reactance. The primary leakage reactance is $(1-c)\omega L_p$. Since only the phase change of non-ideal transformer is concerned, the primary resistance and the leakage reactance are combined together to the impedance $Z_1$.
- $i_p$ and $i_s$ are the currents of the primary and the secondary, respectively,
- $i_0$ is the no load primary current,
- $i_c$ is the core loss component of $i_0$,
- $i_m$ is the magnetizing component of $i_0$, and is the magnetizing current,
- $i_1$ is the transformed secondary current,
- $Z_2$ is the impedance of the secondary side including the secondary resistance, the secondary leakage reactance, and the load. The secondary leakage reactance is $(1-c)\omega L_s$. Again, as only the phase part of the circuit is concerned, the secondary resistance and the secondary leakage reactance are combined together to make one impedance.

The transformer in the dotted rectangle is assumed to be the perfect transformer with $N_p$ and $N_s$ turns at the primary and the secondary, respectively. The turns ratio, n, is:

$$n = N_s/N_p. \quad \text{(Eq. 180)}$$

Among the transformer equations regarding this equivalent circuit, the no load primary current, $i_0$, has been described to be related to $i_s$ as (reference: Thomas Wu, Lecture Notes on EEL 4205 Electric Machinery, Chapter 7 Non-ideal Transformer, The University of Central Florida, accessed Sep. 15, 2017, http://www.eecs.uctedu/-tomwu/course/ee14205/notes/07%20Nonideal%20Transformer.pdf.)

$$i_0 = i_p - (N_s/N_p)i_s = i_p - ni_s. \quad \text{(Eq. 181)}$$

Note, however, the secondary current, $i_s$, has the attenuation and the phase change due to the flux propagation when used at the primary side.

Thus, as the current is modified to have the phase factor, all of the impedance and the power calculations should be done to encompass the phase change accordingly.

5.2 Polyphase Transformers

As the polyphase transformer can be constructed by combining the single phase transformers together, the principle described above can be applied in the same way to one phase of the polyphase transformer. Therefore, the polyphase transformer can be analyzed exactly the same way.

6. Induction Machines

6.1 Induction Machine Model

Induction machines, such as induction motors and induction generators, including linear induction machines, are, in principle, known to be equivalent to the transformers, hence the equivalent circuit of an induction machine per phase is actually as same as the one for the single phase imperfect transformer described above. (reference: Charles Porteus Steinmetz and Ernst J. Berg, *Theory and Calculation of Alternating Current Phenomena*, 3rd edition (New York Electrical World and Engineer Incorporated, 1900), 220.)

As the stator generates a rotating magnetic flux in an induction machine, the induced current is generated in the rotor windings in the same way the secondary current is induced in a transformer. The main difference is that, in the induction machine, there is an air-gap between the primary and the secondary, and thus the magnetizing current is comparatively larger than that of the transformer. (reference: H. Wayne Beaty, ed., "Section 5—Three-Phase Induction Motors by Hashem Oraee" (PDF) *Handbook of Electric Power Calculations* (3rd ed.) (New York: McGraw-Hill, 2006), ISBN 0-07-136298-3.) The parameters in the transformer are interpreted in the induction machine as follows using the same notations in the imperfect transformer:
- $v_p$ is voltage per phase from the power supply,
- $Z_1$ includes the resistance and the leakage reactance of the stator, $R_1$ and $X_1$, respectively:

$$Z_1 = R_1 + jX_1. \quad \text{(Eq. 182)}$$

There may be external impedance at the primary, $Z_{ep}$, $$Z_{ep} = R_{ep} + jX_{ep}, \quad \text{(Eq. 183)}$$

and this can be absorbed in the $Z_1$ expression as well. Thus, $R_1$ and $X_1$ will include $R_{ep}$ and $X_{ep}$, respectively, when external impedance is added as a load at the primary. As in the transformer case, since only the phase part is concerned, all of the resistors and reactances of the stator are combined together to be one impedance, $Z_1$.
- $R_c$ is the stator core loss resistance,
- $X_m$ is the magnetizing reactance,
- $i_p$ and $i_s$ are the currents of the stator and the rotor, respectively,
- $i_0$ is the no load primary current,
- $i_c$ is the core loss component of $i_0$,
- $i_m$ is the magnetizing component of $i_0$, and is the magnetizing current,
- $i_1$ is the rotor current referred to the primary,
- $Z_2$ is the combined impedance of the rotor side:

$$Z_2 = R_2 + jX_2, \quad \text{(Eq. 184)}$$

where $R_2$ is the resistance of the rotor, $X_2$ is the rotor leakage reactance.

There may be external impedance at the secondary, $Z_{es}$, $$Z_{es} = R_{es} + jX_{es}, \tag{Eq. 185}$$

and this can be absorbed in the $Z_2$ expression as well. Thus, $R_2$ and $X_2$ will include $R_{es}$ and $X_{es}$, respectively, when external impedance is added as a load at the secondary. Again, as only the phase part of the circuit is concerned, all the impedance values of the rotor are combined together to make one impedance, $Z_2$, at the rotor side for convenience. The transformer in the dotted rectangle is assumed to be the perfect transformer with $N_p$ and $N_s$ turns at the stator and the rotor, respectively.

6.2 the Condition of the Slip

The slip, $\sigma$, is defined as:

$$\sigma = (\omega_p - \omega_r)/\omega_p, \tag{Eq. 186}$$

where $\omega_p$ and $\omega_r$ are the angular frequencies of the primary and the rotor, respectively. If $\omega_p$ and $\omega_r$ values are the same, then there is no induced current at the rotor. Therefore, the speed of the stator field and that of the rotor should be different for the induction machine to operate.

The stator coils of the induction motor are wound on the slots of the stator core. The stator core is laminated to reduce the eddy current loss. Also steel laminated cores are used in the rotor cores. Therefore, the magnetic path of the induction motor is from the stator core to the rotor core through the air-gap. The phase change in the induction motor occurs mostly in the steel cores, not in the air-gap. To make a change in the phase angle, the magnetic core length, excluding the air-gap, and/or the frequency need to be adjusted, and/or the reactive component(s) need to be added to the machine.

Adjusting the magnetic length of the induction motor can be done in a straightforward way by designing the stator and/or rotor magnetic cores. Adding the reactive component(s) to the circuit is a convenient way to change the phase, and can be done as explained before to help minimize the necessary phase change done by the other two methods: the method of adjusting the length of the core and the method of using frequency change.

Adjusting the frequency is a convenient way to control the phase of the magnetic flux. The speed of the induction machine will be proportional to the frequency, and the machine is running commonly at 50 or 60 Hz. When increasing the frequency, however, the induction machine cannot catch up the speed simply because it cannot rotate very fast mechanically.

The synchronous rotor speed, $n_s$, is related to the number of the poles, $\rho$, as follows:

$$n_s = 120 f/\rho, \tag{Eq. 187}$$

where f is the frequency of the supply power.

For instance, for a 4 pole machine, at 50 Hz, the synchronous speed is 1,500 rpm. But if the frequency is increased to 1 kHz, then it becomes 30,000 rpm. Therefore, to control the phase in the induction machines, there is a need to reduce the rotor speed when using high frequency not to result in a mechanical breakdown.

When a high frequency is used at the stator side, the machine should work at a large value of the slip close to 1 so that the rotor speed is low. As the frequency at the primary should be high to control the phase of the flux, it is necessary to make the rotor speed low at the rotor side. Another way to control the wound rotor speed is to inject slip-frequency voltage into the rotor circuit. (reference: I. Boldea, *The induction machines design handbook, 2nd ed.* (Boca Raton, Fla.: CRC Press/Taylor & Francis, c2010).) In any case, the speed of the rotor should be maintained with the high slip value toward 1 to make the rotor speed low compared to the synchronous speed.

Commonly, in the induction machine, the steel laminated core is used as the magnetic core. But, as the steel laminated core is not effective for the high frequency, magnetic core with some other material efficient at the high frequency might be better to be more effective at high frequency. For example, for adjusting the power factor through controlling the relative phase, ferrite core can be used for the high frequency induction machine.

6.3 Torque

The Thévenin-equivalent voltage and impedance are related to the torque. The torque of the induction machine, T, is proportional to: (reference: H. Wayne Beaty, *Standard Handbook for Electrical Engineers, Edition 16th ed.* (New York: McGraw-Hill Professional Publishing, August 2012), Chapter 20.)

$$T \propto |v_{TH}|^2 R_2 \sigma / [\omega_p \{(\sigma R_{1T} + R_{21})^2 + \sigma^2 (X_{1T} + X_{21})^2\}], \tag{Eq. 188}$$

where $v_{Th}$ is the Thévenin-equivalent voltage, $R_{1T}$ and $X_{1T}$ are the Thévenin's equivalent resistance and reactance of the stator, respectively, when the stator side circuit, including the core loss resistance and the magnetizing reactance, is converted to the Thévenin's equivalent circuit. And $R_{21}$ and $X_{21}$ are the rotor resistance and the rotor leakage reactance referred to the stator side, respectively.

The slip value at the maximal torque, $\sigma_m$, occurs when: (reference: Steinmetz and Berg, *Theory and Calculation of Alternating Current Phenomena*, 250.)

$$\frac{dT}{d\sigma} = 0, \tag{Eq. 189}$$

$$\sigma_m = \frac{R_{21}}{\sqrt{R_{1T}^2 + (X_{1T} + X_{21})^2}}. \tag{Eq. 190}$$

As the machine normally operates when the slip value is less than $\sigma_m$, designing the machine working at large slip values requires making the value of $\sigma_m$ close to 1. Therefore, it is necessary to make $R_{21}$ large by putting external resistance at the rotor side. One disadvantage in using the rheostat is known to be the copper loss due to the added resistance. Note, however, that by adjusting the phase angle of the flux, the power factor at the primary can be made zero, hence the loss at the rotor side does not matter. Actually, as power is "generated" at the rotor side, the copper loss at the rotor side is not a loss any more, and can be regarded as an external load for doing a useful work by consuming the power.

Since the equivalent circuit of an induction machine can be reduced to the equivalent circuit of a transformer, and since the transformer can be analyzed using the impedance and the power difference function, the induction machines can be analyzed exactly in the same way, and all of the properties of the transformer cases examined so far can also be realized in the induction machines.

As the behavior of the machine can be determined by the equation already solved, by controlling the relative phase $\phi$, the induction machine can work as a power generator generating power not only at the rotor side when the power difference function becomes positive, but also at the stator side when the power factor becomes negative. Note that the load can be at the stator side as well as at the rotor side. The load at the stator side does a useful work by consuming the power coming from the rotor side when the power factor is negative.

The principles regarding the power and the impedance can be applicable not only to the single-phase but also the polyphase induction machines, as the polyphase machine can be viewed as the multiple of the single-phase machine.

7. The Power Generating Transformer System

7.1 the Power Generating Transformer System

In general, a transformer is used for changing the voltage, as the voltage at the secondary is proportional to the turns ratio. The main purpose of the transformer circuit invented here is not for altering the voltage, nor for providing power dissipated at the load. On the contrary, it is to generate power at the load by the principle that the power at the primary and the impedance of the circuit depend on the phase of the flux. Here, "generating power" does not mean that it can generate power from nothing, but means that the power dissipated at the load is larger than that at the primary provided by the source.

Therefore, in this transformer circuit, the power at the primary provided by the source becomes small or negative on the average, as the power factor can be close to zero or negative. To accomplish it, the power factor of the circuit needs to be adjusted by controlling the relative phase of the flux, $\phi$.

It is possible to find out the right combination of the frequency and/or path length of the core, and/or the reactive component to be added, using the methods already mentioned, to get the necessary relative phase $\phi$.

Also, the transformer itself should have a core that can work at high frequencies. The common steel laminated cores are not effective at high frequencies. Therefore, some other material having good efficiency at high frequency, a ferrite core for instance, can be used for better efficiency for the core of the transformer of this invention as it works better at high frequencies.

In addition to the transformer, the system needs to have an AC generator to generate the right frequency signal so that the circuit can have the desired power factor or the relative phase $\phi$. The conditions for the relative phase $\phi$ that this AC generator should generate are described in the section "2. Powers." Therefore, the AC generator and the transformer should be paired together so that they can work as the power generator. It is different from the common transformer circuit in that respect. In the common transformer circuit, the AC generator and the transformer are not necessarily tightly paired with each other, in a sense that if the transformer is made to work at a certain broad range of frequencies, and if the AC generator provides a frequency in that particular range, then the circuit has no problem for the load to consume the power.

In the "power generating transformer system" of this invention, however, the AC generator should be closely matched to the configurations of the transformer to have the right frequency or the relative phase $\phi$, so that the power difference function should be positive.

The "AC generator (with the right Frequency)" module in FIG. 5 can consist, for example, of two parts: the frequency synthesizer (reference: Dean Banerjee, *PLL Performance, Simulation and Design*, 4th ed. (Dog Ear Publishing, LLC., August 2006).) and the amplifier parts. The frequency synthesizer generates the frequency that makes the power difference function positive in the "Transformer Circuit," and the amplifier section amplifies the wave of the frequency generated by the frequency synthesizer to feed into the Transformer Circuit with the right voltage amplitude.

FIG. 5 shows a power generating transformer system.

7.2 Transformer Circuit

In case when the power difference function of the transformer circuit becomes positive, there are two cases in general: when there is no load at the primary while there is a load at the secondary, or when there is a load at the primary as well as at the secondary.

The load at the primary or at the secondary can be AC electronic device(s) or DC device(s). If it is DC device(s), then a rectifier is necessary in the transformer circuit. Therefore, the "Transformer Circuit" mentioned here refers to a circuit which includes the necessary rectifier when the load is DC device(s). The load can be one or more batteries or (super)capacitors. When necessary, the voltage can be adjusted in the transformer circuit to an appropriate level so that it can charge the batteries or (super)capacitors. In that case, the batteries or the (super)capacitors work as a new power source to other circuits thereafter.

FIG. 6 shows the power generating transformer system with the load at the primary side as well as at the secondary side.

As already mentioned, the transformer circuit can have the load $Z_1$ at the primary as in FIG. 2, when the power at the primary becomes negative. An example of the "transformer circuit" when the loads are at the primary as well as at the secondary sides is in FIG. 7, where a battery or a (super)capacitor is connected through a rectifier at the primary side. In FIG. 7, when the circuit to the left of the plane crossing points $A_1$ and $A_2$ is converted to the Thévenin's equivalent circuit, the circuit can be analyzed in the same way as the lossless transformer as before. In this way, the power can be generated at the load at the primary side when the power factor becomes negative.

FIG. 7 shows an example of the transformer circuit with the loads at the primary as well as at the secondary, connected to the AC generator with right frequency.

When the primary does not have the load, the power generated at the secondary load should be maximized while the power difference function is positive. When the primary has the load, the power generated at the primary and/or secondary can be maximized, and/or the power difference function can be maximized, depending upon the needs of the user. But the condition that the power difference function is positive should be satisfied at all situations. This condition of making the power difference function positive applies to all areas of this invention, not only to the "power generating transformer system" but also to the "self-sustaining system" described later.

7.3 The AC generator and the static AC generator

In general, the "AC generator (with right frequency)" generates a sinusoidal wave of a frequency. But other forms of waves can be generated if a filter to select a given frequency is attached. Therefore, in that case, it can have two parts: the first part is for generating some form of voltage wave, and the second part is to magnify only the wave of the desired frequency. One example is that the first part generates a square wave voltage, and then it is fed into a series LC filter that passes only the desired frequency with the sinusoidal form. This series LC filter can be the one in the transformer circuit. The AC generator part consumes power, as it needs to generate the necessary wave for the transformer circuit, while the transformer circuit does not need the power to operate on the average.

The AC generator part can be further divided into two kinds: static and dynamic. The static kind is when the AC generator, once made for a fixed frequency, does not change the frequency it generates. This is useful when the impedance of the load does not change. For instance, if the load at the secondary is a battery which is not connected to other devices, then the transformer circuit is used to charge the battery even when no power from the primary flows on the average.

7.4 (Automatic) switching system to charge batteries or (super) capacitors

If the battery that the "power generating transformer system" charges is connected to other devices or a load that consume the power, then the impedance of the load changes, in general. In that case, either the "power generating transformer system with the dynamic AC generator" described below is used, or more than one batteries can be used in such a way that some of the batteries are charged by the "power generating transformer system" while rest of the batteries are used for powering the devices as in FIG. 8. When one battery bank is (fully) charged, then the other battery bank is to be charged in turn, and the devices are to be powered by the (fully) charged battery bank. This can be done by using a switch which does it (automatically) by measuring the charged level of the battery bank. When the device is an AC device, then the DC from the battery can be converted into AC using an inverter to be used in the device. The battery here is an example of a possible source to power the devices. Others can also be used as power sources, for instance, such as a (super)capacitor. When necessary, the voltage can be adjusted in the transformer system into an appropriate level so that it can charge the batteries or (super)capacitors. This (automatic) switch system for charging the battery or (super)capacitor bank is applicable to the whole areas of this invention: not only in the "power generating transformer system," but also in the "self-sustaining system" described below. This (automatic) switching system is applicable to the load not only at the secondary side but also at the primary side as in FIG. 7.

FIG. 8 shows an automatic switching system to charge a battery bank. The devices are powered by the battery bank not being charged by the transformer system.

7.5 the Dynamic AC Generator and the Monitoring Control Module

When the impedance of the load changes, it is necessary to change the frequency dynamically so that the power factor can stay the same, or the power difference function is maximized, or the system stays at the same condition before the change of the impedance of the load, etc. Let the impedance of the circuit be as follows as in (Eq. 150):

$$Z_v = Z_f + |E|\exp\{j(\theta_E - 2\phi)\} = |Z_v|\exp(j\theta_v) = \text{Re}(Z_v) + j\text{Im}(Z_v). \quad \text{(Eq. 191)}$$

The change in the load, or the change in the phase of the circuit impedance, $\Delta\theta_v$, can be monitored by measuring some of the system parameters. A monitoring control module is necessary in order to control the frequency dynamically.

FIG. 9 shows the power generating transformer system with the dynamic AC generator.

For instance, the phase of the circuit impedance, $\phi_v$, can be monitored by observing $P_p$, $v_f(\text{rms})$, and $i_p$ (rms) as in (Eq. 170).

$$\theta_v = a\cos[P_p/\{v_f(\text{rms})i_p(\text{rms})\}]. \quad \text{(Eq. 192)}$$

Then if there is a change in $\theta_v$, the frequency of the AC generator can be changed accordingly to maintain the same $\theta_v$ or to satisfy some conditions related to the powers or the impedances mentioned already. The new frequency with the right amplitude should be generated so that it satisfies the given condition, for instance, the condition of the relative phase $\phi$ concerning the power difference or the power at the load.

7.6 the Module to Decide the Direction and Magnitude of the Frequency Change When there is a change in the phase $\theta_v$ or in some parameters that are monitored, whether to increase or to decrease the frequency is determined by the circuit parameters, such as magnitudes and phases of the impedances, etc. The relative phase $\phi$ is determined as described in the section "4.2 Method of estimating the relative phase." As the relative phase $\phi$ increases as the frequency increases, for a small change in the frequency, the change of the relative phase $\phi$ will be in the same direction as the frequency change, in general.

One of the easiest ways to decide which direction and how much the frequency should change is to use a record of the relation between the relative phase $\phi$ and the frequency. For instance, when initially setting the system, the response of the relative phase $\phi$ to the frequency is to be recorded at a table for given magnitude and phase values of the impedances or other related parameters. And then the direction and the magnitude of the frequency change can be looked up at the recorded table.

One of the ways to make a table is to use a machine learning algorithm. For instance, using a neural network, the direction or the amount of the frequency to change can be trained. For example, a neural network can have input nodes for the phases and magnitudes of the impedances or other related parameters, and an output node for the direction of the frequency or the amount of change of the frequency, with layers of hidden units. After trained, the neural network can be called upon whenever the monitor detects a certain change in the impedance or the phase of the circuit.

This module that decides the direction and/or the amount of the change of the frequency can be in the "monitoring control module" in the form of software, firmware, or hardware.

7.7 when Connected to DC: A Long-Life Battery System

Next, a DC source or an AC source can be connected to the power generating transformer system. Let us consider an example when a DC source is connected to the system. In a smartphone, there is a battery inside. If the battery is connected to the power generating transformer system, then the battery supplies only the power necessary to drive the AC generator part, not the transformer circuit. And the transformer circuit can supply the power for the rest of the circuits in the smartphone. The battery can last longer as a consequence, and it becomes a long-life battery system. As mentioned already, the load at the transformer circuit can be a battery or a (super)capacitor. Then the battery or the (super)capacitor becomes the power source to the rest of the smartphone. Also, as in FIG. 8, the (automatic) switching system to charge one battery bank while the other battery bank is used as the power source of the devices can be applied in this situation.

FIG. 10 shows a long-life battery system.

7.8 when Connected to AC: A System Consuming Low Power

When the power is an AC, and if the frequency of the power is not the desired one that meets the criteria making the power difference function positive, then it is necessary to change the frequency to the desired one. It can be done by a frequency changer. For instance, a rectifier can be used to rectify AC to DC and then using the DC power, the "AC generator with the right Frequency" module can generate the AC necessary for the "Transformer Circuit" module.

FIG. 11 shows a system that consumes low power. The example uses a rectifier as a part of the circuit to change the frequency. In general, the frequency changer is necessary.

Consider a utility power of 50 or 60 Hz is to be connected with the power generating transformer system. But the low frequency is not suitable for the power generating transformer system as it cannot make the power factor low or negative. Thus, if the low frequency is changed to the desired high frequency, and then the high frequency is fed to the transformer in the power generating transformer system, the power for electronic device(s) can be supplied by the transformer in the power generating transformer system. Here, the power from the power grid is used only for converting the low frequency to the high frequency. In that way, a system that does not consume much power can be realized, and at the same time the power that the device(s) needs is also supplied by the system.

7.9 Combining the Systems

The "static AC generator" or the "dynamic AC generator" can be combined with the "long-life battery system" or the "system that consumes low power". In other words, there are four kinds of systems:

"the long-life battery system with the power generating transformer system with the static AC generator,"

"the long-life battery system with the power generating transformer system with the dynamic AC generator"

"the system that consumes low power with the power generating transformer system with the static AC generator," and "the system that consumes low power with the power generating transformer system with the dynamic AC generator."

Also, these systems can be cascaded together to accomplish a certain task.

And the "(automatic) switching system to charge a battery or (super)capacitor bank" can be connected to the transformer outputs of the secondary side and/or the primary side of each of the combined system to charge the battery or (super)capacitor bank.

7.10 Polyphase System

The principles and the applications mentioned so far for a single phase transformer can be applied in the same way to the polyphase transformer, as the polyphase transformer consists of multiple of the single phase transformer.

7.11 the Power Generating Induction Machine System

In this power generating system, the transformer includes the induction machines, such as induction motors and induction generators, including linear induction machines. As already mentioned, the induction machines per phase are equivalent to the single phase transformers. As a polyphase transformer consists of multiple of single phase transformer and as a polyphase induction machine consists of multiple of single phase induction machine, the polyphase transformers and the polyphase induction machines work as the "power generating systems" described above, on the same principle.

The magnetic core of the induction machine is made of laminated steel, and might not be effective for high frequency operation. Therefore, when making a "power generating induction machine system," it is better to make the core of the induction machine with a material which is efficient at high frequencies. For instance, a ferrite core can be used for the magnetic core of the power generating induction machine for a better performance.

Also, the slip value should be close to 1 in order not to result in the machine breakdown. And the slip value that makes the maximal torque should be close to 1. Therefore, in the "power generating induction motor system," the secondary resistance $R_{21}$ in (Eq. 190) should be large.

In general, the induction motors and the induction generators have essentially the same structure. The difference is that when used as a generator, the rotor is turned mechanically to generate power. In this current invention, however, the "power generating induction motor system" works in a different manner. Instead of driving the rotor mechanically by the outside power, rotor is driven by the stator which generates the rotating field in the rotor as the common induction motor does. The difference is that although the stator is connected to the source power, as the power factor can be made close to zero or negative, there is minimal or negative power at the primary, and at the same time, the power is generated at the load at the secondary and/or at the primary. Again, here, the meaning of "generated" is that the power at the load is dissipated when the power difference is positive. When the power factor is negative, the load can be at the stator side also, and the power is generated at the load at the stator side in that case.

Therefore, all of the abovementioned inventions can also be applied to the "power generating induction machine system," made with induction machines, such as induction motors and induction generators, including linear induction machines, when the "induction machine" takes the place of the "transformer circuit" in the "power generating transformer system."

8. Self-Sustaining System

8.1 Self-Sustaining System: A System with a Feedback

The power generating transformer system mentioned above has the input from an AC or a DC power source. It does not have the feedback in the system except in case of the dynamic AC generator.

When the transformer circuit generates electrical power more than the supplied power, the output can be used not only at the load but also be fed back to the system to form a self-sustaining system. In that case, there are two kinds of systems conceivable: a system without a power reservoir and the other kind with a power reservoir. Here, the "output" power means not only the power at the secondary load but also the power at the primary load when the load is also at the primary side when the power at the primary that the source provides becomes negative.

8.2 a Self-Sustaining System without a Power Reservoir

For the first kind without a power reservoir, the output of the transformer is directly fed to the power source to sustain the system. As the output voltage of the transformer is fed back to the system, the output and the input voltage waves should have the same amplitude and the phase, and careful adjustment is needed not to distort the wave form. For instance, one of the ways to have the same amplitude is to adjust the turns ratio of the transformer to compensate the voltage loss caused by the imperfect coupling.

The phase adjustment of the output voltage of the transformer circuit should be done not to distort the voltage signal. It can be done, for instance, by a phase-locked loop (PLL). The phase of the output voltage is compared with that of the input and is adjusted to have the same phase with the input before going into the transformer circuit. Thus, the "amplitude and phase adjustment" module in FIG. 12 does the necessary adjustment in the amplitude and the phase of the output voltage before it is fed as the input of the transformer circuit.

The difference between the "power generating transformer system with the dynamic AC generator" and the "self-sustaining system without a power reservoir" is that in the "monitoring control module" of the "dynamic AC generator," although it changes the frequency, the output wave of the transformer circuit is not fed to the transformer, while in the "self-sustaining system without a power reservoir," as long as there is no load change, the output voltage of the transformer circuit is fed back as an input. When there is a change in the impedance of the load, and therefore when there is a change in the magnitude and/or the phase of the circuit impedance, the "amplitude and phase adjustment" module of the self-sustaining system without a power reservoir should have the functions similar to those that the "monitoring control module" has. In other words, the "amplitude and phase adjustment" module monitors the change in the load situation, and should be able to adapt to a change in the load to generate a voltage wave with appropriate amplitude, phase, and frequency.

FIG. 12 shows a self-sustaining system without a power reservoir.

The power can be extracted from the self-sustaining system to power the load(s). As already mentioned, the load can be at the secondary side when the power difference function is positive, and also at the primary side of the transformer circuit when the power factor is negative. This principle about the load can also be applied to the "self-sustaining system with a power reservoir" mentioned below.

To start a "self-sustaining system without a power reservoir," it is necessary to power the system using an external power supply. When the system goes into the steady state, the external power source can be cut off, and the system becomes self-sustained.

8.3 a Self-Sustaining System with a Power Reservoir

The second kind is the one with a power reservoir. A power reservoir is necessary to contain the power for the AC generating part and the possible load. The output power of the transformer circuit is used to charge the power reservoir.

FIG. 13 shows a self-sustaining system with a power reservoir.

First, the power reservoir is to supply the power to the system. An example of the power reservoir is a battery or a (super)capacitor (bank). Then AC voltage with the right frequency which makes the power difference function positive is generated by an inverter in the AC generator, and it is fed into the transformer. Next, as there is a loss in the imperfect transformer, it is better to adjust the turns ratio of the transformer so that the output voltage can have appropriate voltage level. Or, when the input voltage to the rectifier circuit is predetermined to a fixed value, the amplitude of the output voltage of the transformer circuit needs to be adjusted to that fixed amplitude. In that way, when the output voltage is changed to DC, it can have an appropriate voltage to charge the power reservoir. This procedure to adjust the amplitude of the output voltage of the transformer circuit can be done at this stage or later, as mentioned below, after the rectification procedure. The important thing is to adjust the amplitude of the voltage so that it can be fed into the transformer circuit again with the right amplitude. It is not important at which stage the amplitude of the output voltage is adjusted.

For the "AC to DC" module, one of the ways is to have a rectifier so that the output power of the transformer circuit can be stored into the power reservoir.

The DC from the rectifier goes to the reservoir. As mentioned, the amplitude of the voltage can be adjusted after the rectification.

Because the power factor can be close to zero or even negative, power can be extracted from the system for useful work.

FIG. 14 shows a self-sustaining system with a power reservoir with the monitoring control module.

The "AC generator" in the "self-sustaining system with a power reservoir" can have the additional functions similar to those that the "monitoring control module" has. In that case, the "AC generator" module monitors the change in the load situation, and should be able to adapt to a change in the load to generate a voltage wave with appropriate amplitude and frequency. In that case, it has a feedback loop from the transformer to the AC generator as in FIG. 14, so that the AC generator can have the information about the load situation. Actually, as the load can be attached anywhere in the system, the feedback loop can be from any module in the system to the AC generator. In that case, the structure of the system should be changed accordingly with the right feedback loop.

8.4 the Self-Sustaining System with the (Automatic) Switching

Also, as in FIG. 8, the (automatic) switching system can be used together with the self-sustaining system to charge a battery or (super)capacitor (bank), while the other battery or (super)capacitor (bank) is used as the power source for the devices. Therefore, the "self-sustaining system" can take the place of the "power generating transformer system" in FIG. 8. As already mentioned, not only the secondary but also the primary can be connected to the (automatic) switching system as in FIG. 7.

8.5 Induction Machines

As already mentioned, all of these principles and applications can also be applied to the "self-sustaining system"

made with induction machines, such as induction motors and induction generators, including linear induction machines, when the "induction machine" takes the place of the "transformer circuit" in the "self-sustaining system." They can be applied to not only per phase but also polyphase induction machines.

8.6 Polyphase System

The principles and the applications mentioned so far can also be applied in the same way to the polyphase transformers, as the polyphase transformer consists of multiple of single phase transformer.

8.7 the Combined System

All of the systems described so far, the "power generating transformer system" and the "self-sustaining system," including the system with the induction machines, can be combined together to accomplish a certain task.

8.8 Power Control Module

A power control module to reduce or cut the power when excessive power is generated can be inserted into the "power generating transformer system," the "self-sustaining system," and the (combined) system including the system with the induction machines. When there is excessive power, the excessive power can be diverted to a different load, such as a (variable) resistor. The (variable) resistor works as a (variable) load to absorb the excessive power. The power control module can calculate the appropriate amount of the resistor value for the excessive power to control the variable resistor. The module can be placed anywhere in the system. For instance, the AC generator or the transformer circuit can have the function of the power control module inside. When there is too much power coming out, then the power control module can cut the circuit not to operate.

9. Experiments

Experiment 1

The objective of the experiment is to observe if it is possible to make the power factor of the circuit close to zero by controlling the phase of the flux through changing the frequency. And it is to observe if the power dissipated at the load at the secondary can be larger than the power at the primary supplied from the source.

The transformer is made of two ferrite U-type cores. (reference: Kaschke UI-1F4, 3C85 grade.) The closed-loop magnetic path length of the transformer is 35.4 cm. 1.2 mm copper coil is wound 60 times for the primary and the secondary, respectively. The primary and the secondary self-inductances are 17.210 mH and 17.005 mH, respectively, and the coupling coefficient c is 0.96458, all measured at 10 KHz at 15V using Keysight E4980A LCR meter with the option 001. The load at the secondary, $R_2$, is a resistor of 101.19Ω. A 20V sinusoidal voltage is supplied by Keysight E4980A LCR meter to the transformer. The frequency is varied from 10 KHz to 350 KHz with the 10 KHz interval.

Using N4L PPA5530 precision power analyzer, the voltage and the current at the primary, $v_1$ and $i_p$, respectively, are observed. Also, the phase of the impedance of the circuit and the power at the primary, $\theta_v$ and $P_p$, respectively, are observed. The voltage at the load, $v_2$, is measured using Agilent 3458A multimeter. The experiment is done at the room temperature of 19° C.

Table 1 shows that at 220 KHz, the power factor of the circuit becomes negative, and the power at the primary that the source provides becomes near zero of −698 μW. At 220 KHz, the screen of the N4L PPA5530 precision power analyzer is pictured as in FIG. 15. The phase of the circuit impedance, $\theta_v$, is found by subtracting the phase of the current from that of the voltage, which is 90.17°. Note that the screen shows that the power factor at 220 KH is 0.0030, but it should be −0.0030 which is cos(90.17°).

TABLE 1

Data from the Experiment 1.

| Freq. (KHZ) | $v_1$(rms) (V) | $i_p$(rms) (mA) | $v_2$(rms) (V) | $\theta_v$ (deg) | $P_p$ (mW) | Power Diff. (mW) |
|---|---|---|---|---|---|---|
| 10 | 12.086 | 93.987 | 9.0356 | 41.36 | 852.52 | −45.70 |
| 20 | 14.576 | 79.468 | 7.6907 | 56.43 | 640.46 | −55.95 |
| 30 | 16.304 | 66.268 | 6.4376 | 64.52 | 464.81 | −55.26 |
| 40 | 17.388 | 55.823 | 5.4425 | 69.32 | 342.84 | −50.12 |
| 50 | 18.069 | 47.776 | 4.6739 | 72.51 | 259.47 | −43.59 |
| 60 | 18.522 | 41.554 | 4.0797 | 74.75 | 202.37 | −37.89 |
| 70 | 18.823 | 36.764 | 3.6234 | 76.43 | 162.37 | −32.62 |
| 80 | 19.048 | 32.793 | 3.2462 | 77.82 | 131.75 | −27.61 |
| 90 | 19.203 | 29.516 | 2.9361 | 78.97 | 108.38 | −23.19 |
| 100 | 19.322 | 26.788 | 2.6791 | 79.98 | 90.060 | −19.13 |
| 110 | 19.425 | 24.499 | 2.4631 | 80.84 | 75.702 | −15.75 |
| 120 | 19.502 | 22.526 | 2.2781 | 81.64 | 63.865 | −12.58 |
| 130 | 19.564 | 20.816 | 2.1187 | 82.39 | 53.906 | −9.545 |
| 140 | 19.619 | 19.322 | 1.9803 | 83.12 | 45.394 | −6.639 |
| 150 | 19.660 | 17.999 | 1.8585 | 83.84 | 37.981 | −3.847 |
| 160 | 19.700 | 16.813 | 1.7511 | 84.86 | 29.669 | 0.634 |
| 170 | 19.735 | 15.766 | 1.6556 | 85.31 | 25.418 | 1.670 |
| 180 | 19.766 | 14.803 | 1.5700 | 86.43 | 18.219 | 6.140 |
| 190 | 19.787 | 13.941 | 1.4925 | 86.90 | 14.889 | 7.125 |
| 200 | 19.813 | 13.142 | 1.4227 | 88.17 | 8.3217 | 11.681 |
| 210 | 19.835 | 12.423 | 1.3592 | 88.72 | 5.5172 | 12.740 |
| 220 | 19.856 | 11.751 | 1.3012 | 90.17 | −0.6980 | 17.430 |
| 230 | 19.870 | 11.143 | 1.2476 | 90.83 | −3.1807 | 18.563 |
| 240 | 19.886 | 10.568 | 1.1986 | 92.50 | −9.1615 | 23.359 |
| 250 | 19.902 | 10.052 | 1.1533 | 93.28 | −11.502 | 24.647 |
| 260 | 19.906 | 9.5584 | 1.1105 | 95.16 | −17.071 | 29.258 |
| 270 | 19.925 | 9.1257 | 1.0715 | 96.03 | −19.042 | 30.388 |
| 280 | 19.943 | 8.7161 | 1.0352 | 97.60 | −22.917 | 33.507 |
| 290 | 19.960 | 8.3301 | 1.0012 | 99.97 | −28.691 | 38.597 |
| 300 | 19.969 | 7.9797 | 0.9870 | 101.16 | −30.743 | 40.370 |
| 310 | 19.984 | 7.6566 | 0.9581 | 103.17 | −34.750 | 43.822 |
| 320 | 19.993 | 7.3562 | 0.9308 | 106.13 | −40.705 | 49.267 |
| 330 | 20.006 | 7.0943 | 0.9054 | 107.70 | −42.963 | 51.064 |
| 340 | 20.013 | 6.8585 | 0.8813 | 111.07 | −49.081 | 56.757 |
| 350 | 20.020 | 6.6437 | 0.8585 | 112.89 | −51.451 | 58.735 |

FIG. 15 shows screenshot of N4L PPA5530 at 220 KHz of the experiment 1. Note that the phase of the impedance, $\phi_v$, could not become larger than 90 degrees if it were not for the relative phase of the flux, $\phi$, as can be seen in (Eq. 3). But the precision power analyzer clearly indicates that the phase of the circuit impedance, $\theta_v$, is over 90 degrees from 220 KHz as in FIG. 15 and FIG. 16. As the maximum phase error of N4L PPA5530 at the frequency range of the experiment is 3.505°, it is certain that the phases of the circuit impedance are over 90 degrees at frequencies larger than 260 KHz.

FIG. 16 shows phase of the impedance, $\theta_v$, vs. frequency.

The power difference becomes positive from 160 KHz.

The power difference between the power at the load at the secondary, $P_L$, and the power at the primary is calculated as:

$$P_L - P_p = v_2(\text{rms})^2 / R_2 - P_p. \qquad \text{(Eq. 193)}$$

Experiment 2

In this case, an additional objective of the experiment is to realize a negative resistance. A bar type ferrite core is used. (reference: Samwha Electronics SD 105×15-5T.) The secondary coil is wound over the primary at the center part of the bar. The number of turns at the primary and the secondary is 100 each, with 0.6 mm copper wires. The self-inductance values of the primary and the secondary, $L_p$ and $L_s$, are 1.0146 mH and 0.9912 mH, respectively. The coupling coefficient is 0.97806. All of them are measured at 100 KHz at 10V. The load at the secondary, $R_2$, is a resistor of 101.60Ω. A 10V sinusoidal voltage is supplied to the transformer. Frequency is varied from 100 KHz to 2 MHz with the interval of 100 KHz. The experimental environment is as same as experiment 1.

The voltage and the current at the primary are observed as well as their phases to see if the phase difference between the two becomes Tr. Table 2 shows that at 1.3 MHz, the phase of the circuit impedance, $\theta_v$, is over $\pi/2$, and the power factor becomes negative.

FIG. 17 is the screenshot of N4L PPA5530 at 2 MHz. At 2 MHz, the phase $\theta_v$ is shown to be 181.68° which is over Tr. The phase error of N4L PPA5530 at 2 MHz is 20.005°. Therefore, the phase, $\theta_v$, of the impedance at 2 MHz, is somewhere between 161.675° and 201.685°, where the power factor as well as the resistance value of the impedance is negative.

TABLE 2

Data from the Experiment 2.

| Freq. (KHZ) | $v_1$(rms) (V) | $i_p$(rms) (mA) | $v_2$(rms) (V) | $\theta_v$ (deg) | $P_p$ (mW) | Power Diff. (mW) |
|---|---|---|---|---|---|---|
| 100 | 5.4577 | 48.495 | 4.7298 | 23.82 | 242.12 | −21.93 |
| 200 | 5.7626 | 45.771 | 4.5331 | 25.52 | 238.01 | −35.76 |
| 300 | 6.0460 | 43.829 | 4.3895 | 29.44 | 230.75 | −41.11 |
| 400 | 6.3496 | 41.809 | 4.2562 | 33.02 | 222.57 | −44.27 |
| 500 | 6.5933 | 39.246 | 4.0884 | 36.34 | 208.45 | −43.93 |
| 600 | 6.8467 | 36.788 | 3.9091 | 40.62 | 191.21 | −40.81 |
| 700 | 7.0759 | 33.920 | 3.7257 | 44.83 | 170.38 | −33.76 |
| 800 | 7.2674 | 30.573 | 3.5354 | 49.21 | 146.05 | −23.03 |
| 900 | 7.4692 | 27.475 | 3.3596 | 54.00 | 120.64 | −9.550 |
| 1000 | 7.6931 | 24.211 | 3.1997 | 59.61 | 94.247 | 6.522 |
| 1100 | 7.8739 | 21.260 | 3.0222 | 67.80 | 63.246 | 26.653 |
| 1200 | 8.0707 | 18.501 | 2.8527 | 78.48 | 29.772 | 50.325 |
| 1300 | 8.1852 | 16.129 | 2.6550 | 97.48 | −17.129 | 86.509 |
| 1400 | 8.2598 | 14.795 | 2.4450 | 115.53 | −52.371 | 111.21 |
| 1500 | 8.2866 | 15.240 | 2.2211 | 135.33 | −89.096 | 137.65 |
| 1600 | 8.4301 | 17.724 | 1.9923 | 154.22 | −133.33 | 172.40 |
| 1700 | 8.5628 | 21.547 | 1.7674 | 167.88 | −180.09 | 210.84 |
| 1800 | 8.6154 | 26.413 | 1.5300 | 172.77 | −225.53 | 248.57 |
| 1900 | 8.6536 | 32.346 | 1.3011 | 178.45 | −279.40 | 296.06 |
| 2000 | 8.5717 | 38.893 | 1.0675 | 181.68 | −332.70 | 343.92 |

FIG. 17 shows screenshot of N4L PPA5530 at 2 MHz of experiment 2.

FIG. 18 shows powers and the power difference vs. frequency. $P_L$ is the power at the load at the secondary, $P_p$ the power at the primary, ($P_L$-$P_p$) the power difference.

The power difference is measured as before, and FIG. 18 shows that it is positive from 1 MHz, and the power at the primary provided by the source, $P_p$, becomes negative from 1.3 MHz, implying that the power flows backward at the primary.

The power expressions at the primary and at the load at the secondary in the transformer circuit have different factors in the phase of the flux, hence in the phase of the current. Therefore, the power dissipated at the load at the secondary is different from that at the primary provided by the source.

In this invention, it is shown for the first time that, in the transformer circuit, the power is dependent on the phase of the flux. Not only that, it is shown that the phase of the flux can be controlled so that the power at the primary delivered from the source can be made lesser than that dissipated at the load.

The invention claimed is:

1. A power factor adjustment apparatus, comprising:
   a magnetic core;
   a primary coil wound on the magnetic core configured to receive an alternating voltage from a source;
   wherein, a current is generated in a secondary coil of a transformer circuit or in a rotor of an induction machine by a magnetic flux propagated through the magnetic core,
   wherein, a phase change of the magnetic flux between the primary coil and the secondary coil is controlled so that a power factor of the transformer circuit or the induction machine is adjusted to a desired one among values that make a power difference function, representing difference between a power dissipated at a load at a secondary side and a power at the primary coil that the source provides, positive.

2. The power factor adjustment apparatus of claim 1, wherein an absolute value of the phase change of the magnetic flux is proportional to a distance that the magnetic flux propagates through the magnetic core, and wherein the absolute value of the phase change of the magnetic flux increases as a frequency of the current wave increases.

3. The power factor adjustment apparatus of claim 1, wherein the phase change of the magnetic flux is controlled by altering a path length of the magnetic core, and/or by altering frequency of the alternating voltage, and/or by adding reactive components.

4. The power factor adjustment apparatus of claim 1, wherein the magnetic core is made of laminated steel, ferrite, or any other material suited for high frequency range for a necessary phase change of the magnetic flux.

5. The power factor adjustment apparatus of claim 1, wherein the power factor adjustment apparatus is configured as a part of the transformer circuit or the induction machine.

6. The power factor adjustment apparatus of claim 1, further comprising an AC generator configured to generate the alternating voltage of frequency and amplitude that make a phase of an impedance or the power difference function of the transformer circuit or the induction machine be within a specified range.

7. The power factor adjustment apparatus of claim 1, wherein the load is connected to a primary side or the secondary side of the transformer circuit or the induction machine.

* * * * *